(12) United States Patent  
Yamamoto et al.

(10) Patent No.: US 8,520,485 B2  
(45) Date of Patent: Aug. 27, 2013

(54) RECORDING APPARATUS AND SERVO CONTROL METHOD

(75) Inventors: Kenji Yamamoto, Kanagawa (JP); Takashi Nakao, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/461,423

(22) Filed: May 1, 2012

(65) Prior Publication Data

US 2012/0294128 A1 Nov. 22, 2012

(30) Foreign Application Priority Data

May 19, 2011 (JP) ................................. 2011-112011

(51) Int. Cl.
*G11B 7/0065* (2006.01)

(52) U.S. Cl.
USPC ......................................................... 369/103

(58) Field of Classification Search
None
See application file for complete search history.

(56) References Cited

U.S. PATENT DOCUMENTS

| 4,782,474 | A | * | 11/1988 | Arai et al. .................. 369/44.14 |
| 5,295,125 | A | * | 3/1994 | Oonishi et al. ............. 369/44.29 |
| 7,936,657 | B2 | * | 5/2011 | Fujita et al. .................... 369/103 |
| 2004/0212859 | A1 | * | 10/2004 | Tsukagoshi ..................... 359/15 |
| 2006/0114792 | A1 | * | 6/2006 | Uno et al. ...................... 369/103 |
| 2008/0198429 | A1 | * | 8/2008 | Uno et al. ........................ 359/21 |

FOREIGN PATENT DOCUMENTS

| JP | 2009-274225 | 11/2009 |
| JP | 2010-162846 | 7/2010 |

* cited by examiner

*Primary Examiner* — Peter Vincent Agustin
(74) *Attorney, Agent, or Firm* — K&L Gates LLP

(57) ABSTRACT

A recording apparatus includes the following elements. A recording light source emits pulse laser light for recording. A first light source emits first CW laser light. An irradiation optical system irradiates an optical recording medium with the pulse laser light and the first CW laser light via an objective lens in the state in which the optical axis of the first CW laser light is tilted with respect to the optical axis of the pulse laser light. A reception optical system outputs, to a first light receiver, a returned light portion of the first CW laser light which has been reflected by a reflection surface formed on the optical recording medium and which has been input through the objective lens. A focus servo controller performs focus servo control for the objective lens on the basis of a first reception signal obtained by the first light receiver.

8 Claims, 13 Drawing Sheets

RECORDING APPARATUS AND SERVO CONTROL METHOD

CROSS REFERENCES TO RELATED APPLICATIONS

The present application claims priority to Japanese Priority Patent Application JP 2011-112011 filed in the Japan Patent Office on May 19, 2011, the entire content of which is hereby incorporated by reference.

BACKGROUND

The present application relates to a recording apparatus that performs recording on an optical recording medium by utilizing pulse laser light as recording laser light, and also to a servo control method for the recording apparatus.

As optical recording media on which recording and playback is performed through irradiation of light, so-called optical discs, such as compact discs (CDs), digital versatile discs (DVDs), Blu-ray discs (BDs) (registered trademark), are widely used.

As next-generation optical recording media that will supersede currently widespread optical recording media, such as CDs, DVDs, and BDs, the assignee of this application has proposed optical recording media utilizing a nonlinear light absorption effect, such as those disclosed in Japanese Unexamined Patent Application Publication Nos. 2010-162846 and 2009-274225.

In an optical recording system utilizing such a nonlinear light absorption effect, a pulse laser light source is preferably used as a recording light source. This is because relatively high peak power is necessary for obtaining the nonlinear light absorption effect.

SUMMARY

In an optical recording system, focus servo control is performed in order to record information at a desired layer position on a medium.

Hitherto, in an optical disc system, such as a CD, a DVD, or a BD, a continuous wave (CW) laser device is used as a recording light source. Accordingly, focus servo control during recording is performed by utilizing light returned from a medium that has been irradiated with recording laser light.

However, if pulse laser light is used as recording laser light, it is very difficult to utilize light returned from a medium that has been irradiated with pulse laser light for performing focus servo control.

FIG. 13 illustrates an example of a waveform of a focus error signal generated as a result of receiving light returned from a medium that has been irradiated with pulse laser light. In FIG. 13, a so-called S-shaped waveform obtained while a focus search is being performed is illustrated by way of example.

As illustrated in FIG. 13, a component corresponding to the oscillation frequency of a pulse laser light source is superposed on the focus error signal generated from a reception signal of pulse laser light. Accordingly, it is very difficult to correctly perform a focus search, and even if a focus search on a target layer is correctly performed, it is very difficult to implement stable focus servo control.

It is thus desirable to continue stable focus servo control in an optical recording system in which pulse laser light is utilized as recording laser light.

According to an embodiment of the present application, there is provided a recording apparatus including: a recording light source configured to emit pulse laser light for recording; a first light source configured to emit first CW laser light; an irradiation optical system configured to irradiate an optical recording medium with the pulse laser light and the first CW laser light via an objective lens in the state in which an optical axis of the first CW laser light is tilted with respect to an optical axis of the pulse laser light; a reception optical system configured to output, to a first light receiver, a returned light portion of the first CW laser light which has been reflected by a reflection surface formed on the optical recording medium and which has been input through the objective lens; and a focus servo controller configured to perform focus servo control for the objective lens on the basis of a first reception signal obtained by the first light receiver.

As described above, in the present application, recording pulse laser light is applied, and at the same time, first CW laser light whose optical axis is tilted is separately applied for performing focus servo control. In this case, since the optical axis of the first CW laser light is tilted with respect to the optical axis of the pulse laser light, the first light receiver can selectively receive only the light reflected by (returned from) a medium that has been irradiated with of the first CW laser light. With this arrangement, the influence of the pulse laser light can be effectively reduced when performing focus servo control. As a result, it is possible to stably perform focus servo control when pulse laser light is utilized as recording laser light.

According to the present application, in an optical recording system in which pulse laser light is utilized as recording laser light, stable focus servo control performed during recording is implemented.

Additional features and advantages are described herein, and will be apparent from the following Detailed Description and the figures.

DETAILED DESCRIPTION

Embodiments of the present application will be described below in the following order.
1. First Embodiment
1-1. Optical Recording Medium
1-2. Recording Method for Optical Recording Medium
1-3. Configuration of Recording Apparatus
1-4. Servo Control Method of First Embodiment
1-5 Summary
2. Second Embodiment
3. Third Embodiment
4. Modified Examples
1. First Embodiment
1-1. Optical Recording Medium FIG. 1 is a sectional view illustrating a structure of a multilayered optical recording medium 1, which will be used as an object for recording, according to a first embodiment of the present application.

Figure 1:
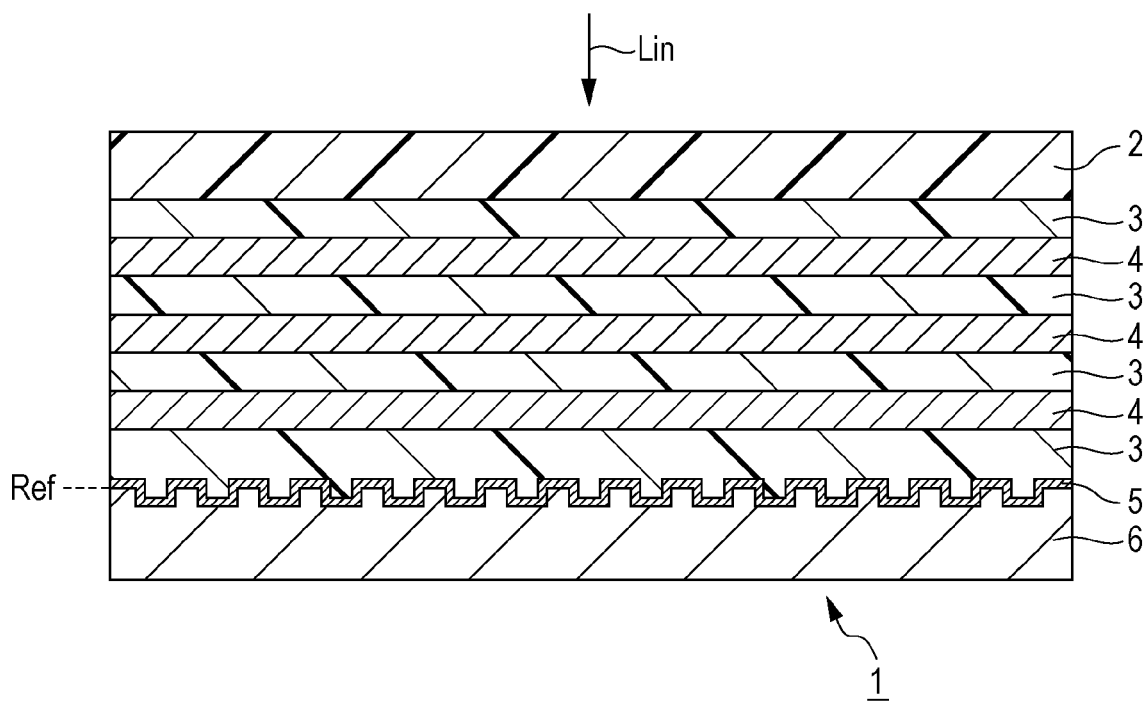
FIG. 1 is a sectional view illustrating a structure of a multilayered optical recording medium used in an embodiment.

The multilayered optical recording medium 1 shown in FIG. 1 is a disc-shaped optical recording medium. While the multilayered optical recording medium 1 is being driven and rotated, it is irradiated with laser light, thereby performing mark recording (information recording). When playing back recorded information, the multilayered optical recording medium 1 is also irradiated with laser light while it is being driven and rotated.

In FIG. 1, the direction in which laser light is applied to the multilayered optical recording medium 1 in order to record or play back information is indicated by "Lin".

The multilayered optical recording medium 1 is formed by sequentially stacking a cover layer 2, a multilayer body formed of intermediate layers 3 and recording layers 4, a reflection film 5, and a substrate 6 from the top side. The intermediate layers 3 and the recording layers 4 are alternately stacked to form the multilayer body.

In this specification, the term "top side" indicates the top layer of the multilayered optical recording medium 1 when the surface on which laser light is incident faces upward.

The cover layer 2 is formed of a resin, such as a polycarbonate or acrylic resin, and protects a recording region formed under the cover layer 2.

Under the cover layer 2, the multilayer body formed by alternately stacking the intermediate layers 3 and the recording layers 4 is disposed. The multilayer body serves as a recording region in which recording marks are formed in a multilayered configuration.

The number of recording layers 4 in the recording region is set to be x (x is a natural number of two or greater). In FIG. 1, the multilayered optical recording medium 1 when x is 3 is shown by way of example. However, this is merely for the convenience of representation, and in practice, x may range, for example, from 10 to 15.

In this embodiment, the refractive index of the intermediate layers 3 is different from that of the recording layers 4. With this setting, the interfaces between the intermediate layers 3 and the recording layers 4, i.e., the top surfaces and the bottom surfaces of the recording layer 4, serve as reflection surfaces due to the difference between the refractive index of the intermediate layers 3 and that of the recording layers 4.

A specific refractive index of the intermediate layers 4 may be 1.45, while that of the intermediate layers 3 may be, for example, 1.65.

The reflectance of the interfaces between the recording layers 4 and the intermediate layers 3 are set to be, for example, about 0.5%, and the transmittance of the interfaces therebetween is set to be, for example, about 96%.

The recording layers 4 are formed of a material that causes the refractive index to be changed or causes thermal expansion in a portion in the vicinity of the focal point of recording laser light applied to the recording layers 4.

In this embodiment, the recording layers 4 are formed of a material that causes the refractive index to be changed or causes thermal expansion in a portion in the vicinity of the focal point of laser light in accordance with a rise in temperature caused by nonlinear light absorption.

The intermediate layers 3 are formed of, for example, a thermoplastic resin, and more specifically, a polycarbonate resin.

Under the multilayer body of the intermediate layers 3 and the recording layers 4, a layer including the reflection film 5 and the substrate 6 is formed.

On the surface of the substrate 6, a position guiding element is formed. More specifically, in this embodiment, a guide groove section is spirally formed as a group of grooves or pits and serves as a position guiding element.

If the guide groove section is formed as a group of grooves, the grooves are periodically formed in a meandering shape, thereby making it possible to record position information (address information) in accordance with information representing periodically meandering grooves. If the guide groove section is formed as a group of pits, position information is recorded through the use of modulation of pit lengths.

As shown in FIG. 1, the reflection film 5 is formed on the surface of the substrate 6 on which the guide groove section is formed. The bottom surface of the bottommost intermediate layer 3 of the multilayer body is bonded onto the reflection film 5.

In the following description, the reflection surface of the reflection film 5 (on which the position guiding element is formed) is indicated by reference surface Ref.

1-2. Recording Method for Optical Recording Medium

Figure 2:
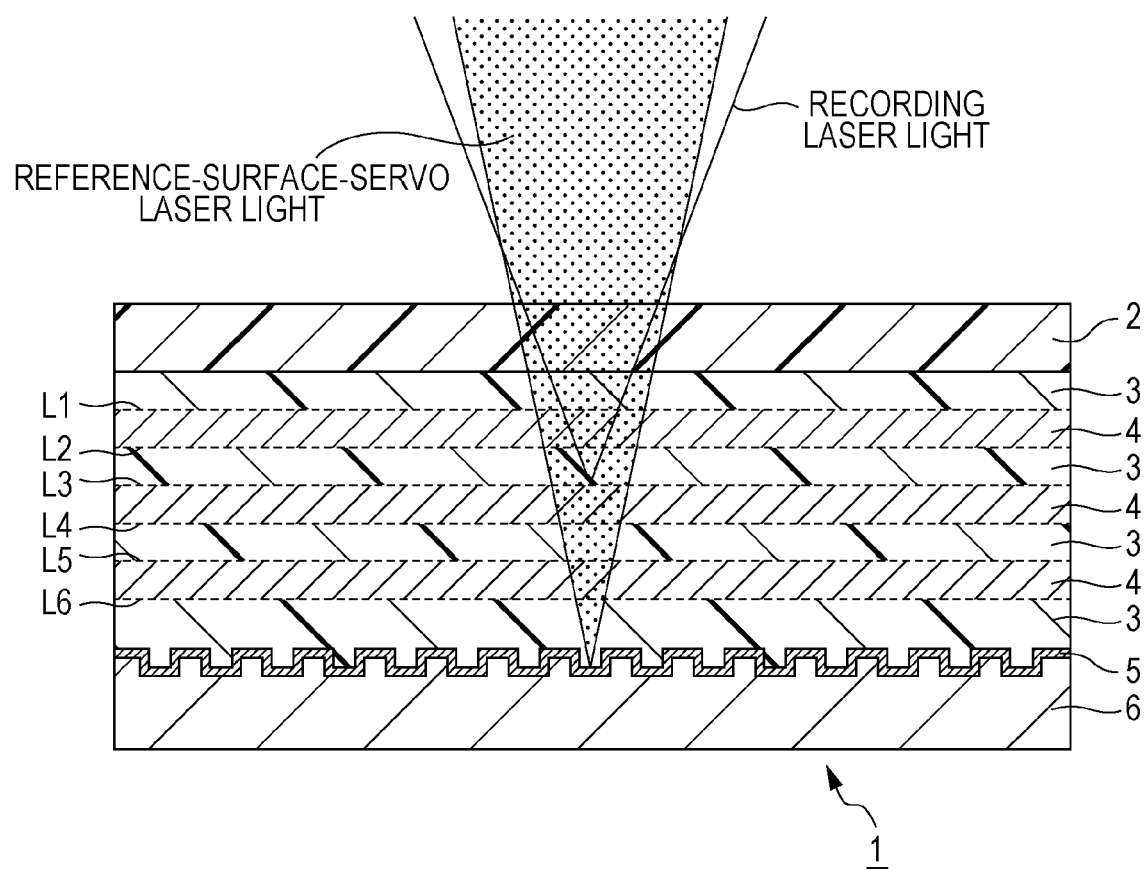
FIG. 2 illustrates a recording method for a multilayered optical recording medium according to an embodiment.

FIG. 2 illustrates a recording method for the multilayered optical recording medium 1 shown in FIG. 1.

In FIG. 2, the interfaces between the recording layers 4 and the intermediate layers 3 are indicated by L1, L2, L3, L4, L5, and L6 from the top layer.

In this embodiment, a recording method is employed in which recording laser light is focused on each of the top and bottom surfaces (interfaces L) of the recording layers 4, thereby forming recording marks.

In such interface recording, if the number x of recording layers 4 shown in FIG. 2 is three, the number of interfaces on which recording can be performed is six. That is, recording can be performed by using twice as many layers as recording layers 4.

In such interface recording, in order to achieve the same recording capacity, the number of layers of a multilayer body formed by stacking the intermediate layers 3 and the recording layers 4 can be decreased to half the original number, in comparison with a multilayered optical recording medium in which only one surface is used per recording layer for performing mark recording.

In the multilayered optical recording medium 1, each interface L is a mere interface between the intermediate layer 3 and the recording layer 4, and unlike the reference surface Ref, a position guiding element is not formed on the interface L.

As stated above, each interface L serves as a reflection surface due to the difference in the refractive index between the intermediate layer 3 and the recording layer 4. Accordingly, the interfaces L are subjected to focus servo control. However, since a position guiding element is not formed on the interfaces L, it is difficult to perform tracking servo control, on the basis of reflected light from the interfaces L, on the interfaces L on which marks have not yet been formed when recording is started.

Accordingly, in this embodiment, tracking servo control during recording is performed by using the reference surface Ref provided in the multilayered optical recording medium 1. More specifically, laser light for reference surface servo control (hereinafter referred to as "reference-surface-servo laser light") is applied separately from recording laser light, and tracking servo control for an objective lens is performed on the basis of reflected light returned from the reference surface Ref irradiated with the reference-surface-servo laser light.

As will be discussed later, recording laser light and reference-surface-servo laser light are applied to the multilayered optical recording medium 1 through the same objective lens. Thus, as stated above, tracking servo control for the objective lens is performed on the basis of reflected light returned from the reference surface Ref irradiated with the reference-surface-servo laser light, and at the same time, tracking control for the recording laser light can also be performed.

1-3. Configuration of Recording Apparatus

In this embodiment, in order to perform mark recording by utilizing the nonlinear light absorption effect, pulse laser light is used as recording laser light.

Figure 13:
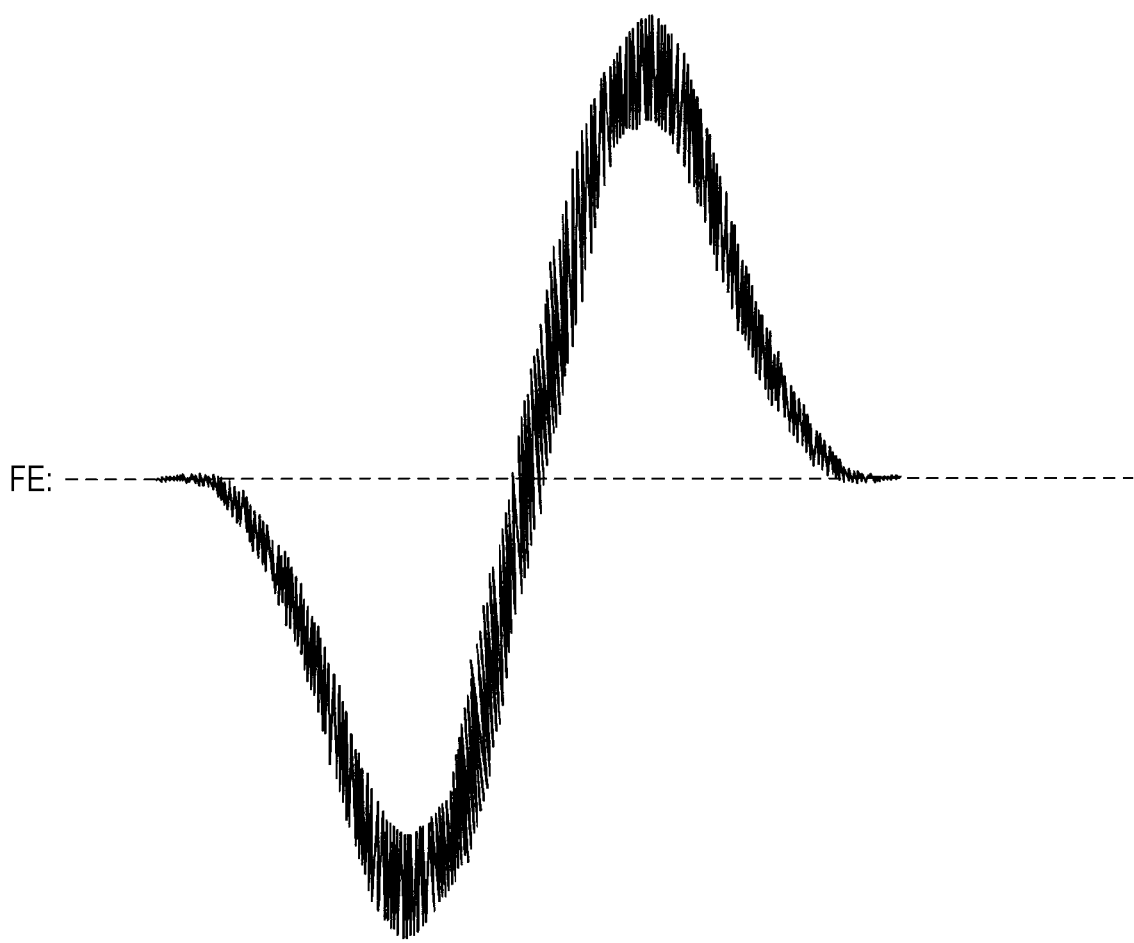
FIG. 13 illustrates an example of a focus error signal (S-shaped signal) generated as a result of receiving light returned from a medium that has been irradiated with pulse laser light.

However, when pulse laser light is used for recording, it is very difficult to perform focus servo control on the basis of reflected light returned from the interface irradiated with the pulse laser light, as discussed with reference to FIG. 13.

In this embodiment, therefore, the recording apparatus has the following configuration.

Figure 3:
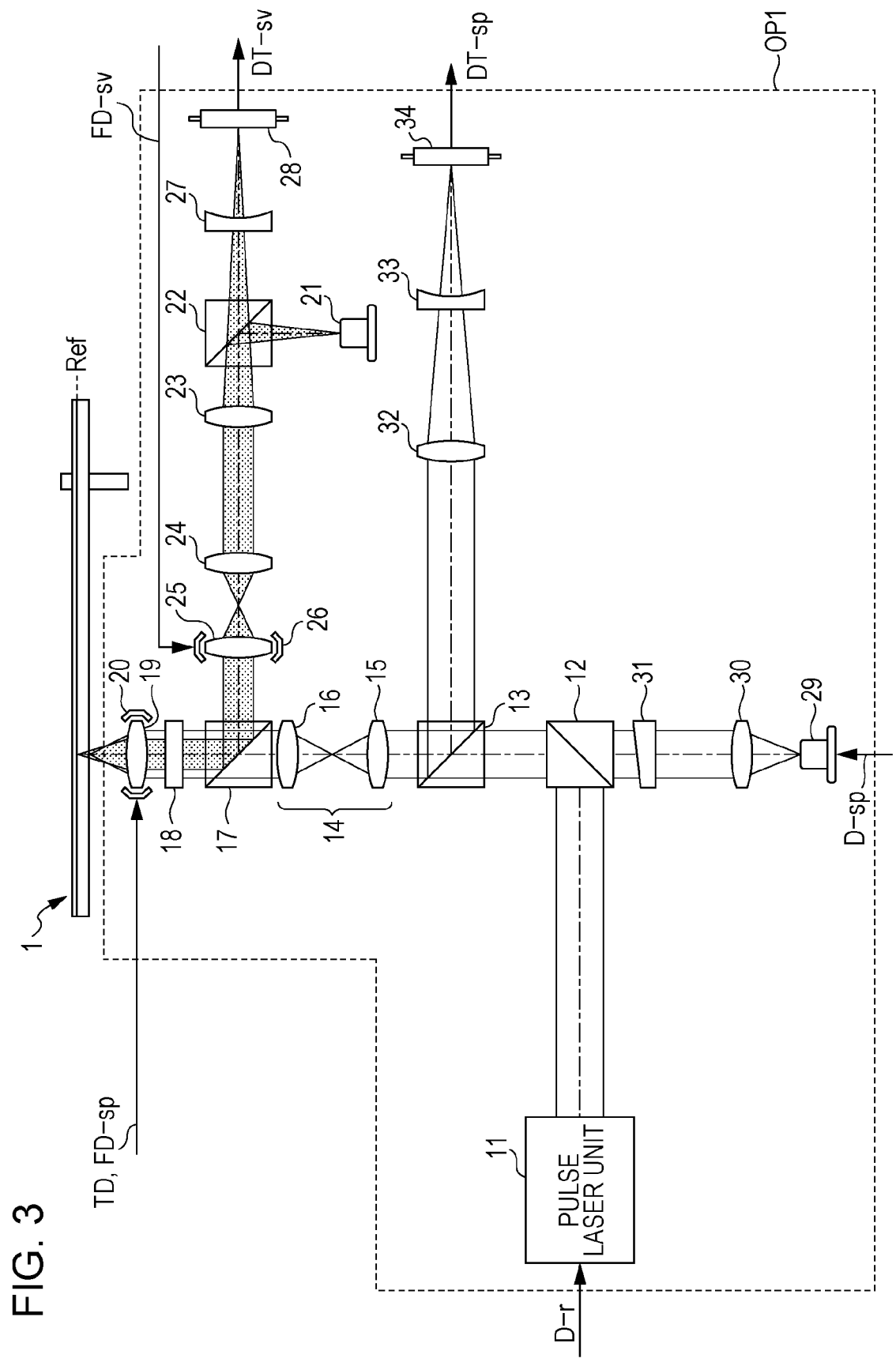
FIG. 3 illustrates an example of the configuration of an optical system included in a recording apparatus according to a first embodiment.

FIG. 3 illustrates an example of the configuration of an optical system included in a recording apparatus 10 of the first embodiment. More specifically, FIG. 3 illustrates an example of the internal configuration of an optical pickup OP1 included in the recording apparatus 10.

In FIG. 3, the multilayered optical recording medium 1 mounted on the recording apparatus 10 is set at a predetermined position of the recording apparatus 10 such that the center hole of the multilayered optical recording medium 1 is clamped. The multilayered optical recording medium 1 is also retained such that it can be driven and rotated by a spindle motor (not shown).

The optical pickup OP1 irradiates the multilayered optical recording medium 1, which is being driven and rotated by the spindle motor, with recording laser light and reference-surface-servo laser light, such as those shown in FIG. 2. In this embodiment, servo/playback laser light is also applied together with the recording laser light and the reference-surface-servo laser light.

The optical pickup OP1 includes a pulse laser unit 11 as a light source for recording laser light. The pulse laser unit 11 emits pulse laser light having a relatively single pulse width on the order of, e.g., picoseconds.

In this embodiment, as the pulse laser unit 11, a master oscillator power amplifier (MOPA) having a combination of a mode locked laser diode (MLLD) and a semiconductor optical amplifier (SOA) is used.

As in the related art, in the MOPA, the SOA is driven in accordance with recording data, thereby performing laser emission in accordance with the recording data. For example, in accordance with data "1", the SOA amplifies and outputs pulse laser light output from the MLLD, and in accordance with data "0", the SOA turns OFF (amplification factor≈0) pulse laser light output from the MLLD, thereby performing laser emission in accordance with the recording data.

Hereinafter, a drive signal supplied to the pulse laser unit 11 is indicated by the drive signal D-r.

In this embodiment, the wavelength of pulse laser light emitted from the pulse laser unit 11 is, for example, about 405 nm.

Recording laser light emitted from the pulse laser unit 11 is incident on a beam splitter (BS) 12.

The beam splitter 12 reflects part of the recording laser light and outputs the reflected light to a polarization beam splitter (PBS) 13.

In this embodiment, the polarization beam splitter 13 is configured to transmit P-polarized components and to reflect S-polarized components.

Accordingly, out of the recording laser light supplied from beam splitter 12, the P-polarized components pass through the polarization beam splitter 13.

The recording laser light passing through the polarization beam splitter 13 is incident on an expander 14. The expander 14, which is provided for correcting spherical aberration, includes a convex lens 15 disposed closer to the light source (pulse laser unit 11) and a convex lens 16 disposed farther away from the light source.

Although it is not shown, the expander 14 includes an actuator that holds the convex lens 16 such that the convex lens 16 is driven in parallel with the optical axis, thereby correcting spherical aberration.

The recording laser light is incident on a dichroic prism 17 through the expander 14.

The dichroic prism 17 is configured to transmit light having the same wavelength band as that of recording laser light and to reflect light having a wavelength band other than that of the recording laser light.

Accordingly, the recording laser light passes through the dichroic prism 17.

The recording laser light passing through the dichroic prism 17 is incident on an objective lens 19 through a quarter wavelength retardation plate 18. The objective lens 19 focuses recording laser light and irradiates the multilayered optical recording medium 1 with the focused laser light.

The objective lens 19 is provided with a biaxial actuator 20 that holds the objective lens 19 so that the objective lens 19 is displaceable in the focusing direction (in a direction close to or away from the multilayered optical recording medium 1) and in the tracking direction (in a direction orthogonal to the focusing direction, in other words, a direction parallel with the radial direction of the multilayered optical recording medium 1).

The biaxial actuator 20 includes a tracking coil and a focusing coil. A drive signal (tracking drive signal TD or focusing drive signal FD-sp, which will be discussed later) is supplied to each of the tracking coil and the focusing coil, thereby displacing the tracking coil and the focusing coil in the tracking direction or in the focusing direction, respectively.

The optical pickup OP1 includes an optical system for reference-surface-servo laser light, as well as an optical system for the above-described recording laser light.

A reference-surface-servo light laser device 21 is provided as a light source for the reference-surface-servo laser light.

The wavelength of the reference-surface-servo laser light is different from that of the recording laser light. More specifically, in this embodiment, the wavelength of the reference-surface-servo laser light is about 650 nm.

As the reference-surface-servo light laser device 21, a CW laser device is used.

Reference-surface-servo laser light emitted from the reference-surface-servo light laser device 21 is directed to a polarization beam splitter 22 in the form of diverging light.

The polarization beam splitter 22 is configured to transmit P-polarized components and to reflect S-polarized components. Accordingly, out of the reference-surface-servo laser light, S-polarized components are reflected by the polarization beam splitter 22.

The reference-surface-servo laser light reflected by the polarization beam splitter 22 is collimated by a collimation lens 23, and is incident on a reference-surface-servo light focusing mechanism including a fixed lens 24, a movable lens 25, and a lens driving unit 26.

In the reference-surface-servo light focusing mechanism, the fixed lens 24 is disposed close to the light source (reference-surface-servo light laser device 21), while the movable lens 25 is disposed away from the light source. The movable lens 25 is driven by the lens driving unit 26 in a direction parallel with the optical axis, thereby independently performing focusing control for the reference-surface-servo laser light.

In the reference-surface-servo light focusing mechanism, the movable lens 25 is driven on the basis of a focus driving signal FD-sv, which is generated on the basis of reflected light returned from the reference surface Ref irradiated with the reference-surface-servo laser light, which will be discussed later.

The reference-surface-servo laser light is incident on the dichroic prism 17 after passing through the reference-surface-servo light focusing mechanism (in the direction from the fixed lens 24 to the movable lens 25).

As stated above, the dichroic prism 17 is configured to transmit light having the same wavelength band as that of the recording laser light and to reflect light having a wavelength band other than that of the recording laser light. Accordingly, the reference-surface-servo laser light incident on the dichroic prism 17 is reflected by the dichroic prism 17, and is focused on the objective lens 19 after passing through the quarter wavelength retardation plate 18. The reference-surface-servo laser light is then applied to the multilayered optical recording medium 1 (reference surface Ref).

The reference-surface-servo laser light applied to the multilayered optical recording medium 1 in this manner is reflected by the reference surface Ref, and the reflected light returned from the multilayered optical recording medium 1 passes through the objective lens 19 and is reflected by the dichromic prism 17 via the quarter wavelength retardation plate 18.

After being reflected by the dichroic prism 17 as described above, the reflected light returned from the reference surface Ref irradiated with the reference-surface-servo laser light passes through the reference-surface-servo light focusing mechanism (in the direction from the movable lens 25 to the fixed lens 24). Then, the reflected light is converted into convergent light by the collimation lens 23 and is incident on the polarization beam splitter 22.

The polarization direction of the reflected light returned from the multilayered optical recording medium 1 irradiated with the reference-surface-servo laser light which is incident on the polarization beam splitter 22 is different from that of the reference-surface-servo laser light (which has not been returned from the multilayered optical recording medium 1) by 90 degrees due to the action of the quarter wavelength retardation plate 18 and the action of the reflection of light on the reference surface Ref (reflection film 5). In this case, the reflected light is P-polarized light. As a result, the reflected light returned from the reference surface Ref irradiated with the reference-surface-servo laser light which is incident on the polarization beam splitter 22 passes through the polarization beam splitter 22.

The reflected light passing through the polarization beam splitter 22 is focused on a light receiving surface of a reference-surface-servo light receiver 28 via a cylindrical lens 27 due to the action of the collimation lens 23.

The reception signal obtained as a result of receiving the reflected light by the reference-surface-servo light receiver 28 is indicated by a reception signal DT-sv shown in FIG. 3.

In this embodiment, an optical system for servo/playback laser light is also provided. More specifically, laser light emitted from a servo/playback light laser device 29, which is used as a light source, (hereinafter referred to as "servo/playback laser light") is applied to the multilayered optical recording medium 1 via the objective lens 19, and is reflected by the multilayered optical recording medium 1. The reflected light is then received.

The wavelength of the servo/playback laser light is similar to that of the recording light emitted from the pulse laser unit 11, and is about 405 nm in this embodiment.

As the servo/playback light laser device 29, a CW laser device is used.

The servo/playback laser light is collimated by a collimation lens 30 and is incident on a wedge prism 31.

The wedge prism 31 tilts the optical axis of the incident servo/playback laser light at a predetermined angle and outputs the servo/playback laser light.

The servo/playback laser light whose optical axis is tilted by the wedge prism 31 is incident on the above-described beam splitter 12.

In this embodiment, the recording laser light output from the pulse laser unit 11 is incident on the front side of the reflection surface of the beam splitter 12. In contrast, the servo/playback laser light is incident on the back side of the reflection surface of the beam splitter 12. With this arrangement, the recording laser light and the servo/playback laser light are incident on the beam splitter 12 such that they are substantially orthogonal to each other. Accordingly, the beam splitter 12 outputs the recording laser light and the servo/playback laser light to the objective lens 19 in the state in which they overlap each other.

After passing through the beam splitter 12, the servo/playback laser light is incident on the polarization beam splitter 13. The polarization beam splitter 13 transmits P-polarized components of the servo/playback laser light.

After passing through the polarization beam splitter 13, the servo/playback laser light is incident on the dichroic prism 17 through the expander 14.

Since the recording laser light and the servo/playback laser light have the same wavelength band, the servo/playback laser light passes through the dichroic prism 17.

After passing through the dichroic prism 17, the servo/playback laser light is focused on the objective lens 19 via the quarter wavelength retardation plate 18. The focused servo/playback laser light is then applied to the multilayered optical recording medium 1.

The servo/playback laser light applied to the multilayered optical recording medium 1 is reflected by the multilayered optical recording medium 1 (by the interface L on which recording or playback is performed). The reflected light returned from the interface L irradiated with the servo/playback laser light passes through the objective lens 19 and is output to the dichroic prism 17 via the quarter wavelength retardation plate 18. The dichroic prism 17 transmits the reflected light returned from the interface L irradiated with the servo/playback laser light, and the reflected light is then incident on the polarization beam splitter 13 via the expander 14.

The polarization direction of the reflected light returned from the multilayered optical recording medium 1 irradiated with the servo/playback laser light which is incident on the polarization beam splitter 13 is different from that of the servo/playback laser light (which has not been returned from the multilayered optical recording medium 1) by 90 degrees due to the action of the quarter wavelength retardation plate 18 and the action of the reflection of light on the multilayered optical recording medium 1. As a result, the reflected light returned from the multilayered optical recording medium 1 irradiated with the servo/playback laser light is reflected by the polarization beam splitter 13.

After being reflected by the polarization beam splitter 13, the reflected light is converted into convergent light by a condensing lens 32, and is focused on a light receiving surface of a servo/playback light receiver 34 via a cylindrical lens 33.

A reception signal generated as a result of receiving the reflected light by the servo/playback light receiver 34 is indicated by a reception signal DT-sp shown in FIG. 3.

As stated above, the servo/playback laser light is applied to the multilayered optical recording medium 1 after the optical axis of the servo/playback laser light is tilted by the wedge prism 31 at a predetermined angle with respect to the optical axis of the recording laser light. Accordingly, when the servo/playback laser light is returned from the multilayered optical recording medium 1 as the reflected light, the optical axis of the reflected light is also tilted with respect to the optical axis of the recording laser light (returned light).

A light-receiving optical system including the condensing lens 32, the cylindrical lens 33, and the servo/playback light receiver 34 is configured (designed) to receive the reflected light which is returned from the multilayered optical recording medium 1 irradiated with servo/playback laser light in the state in which the optical axis is tilted.

The internal configuration of the recording apparatus 10 will now be described below with reference to FIG. 4.

Figure 4:
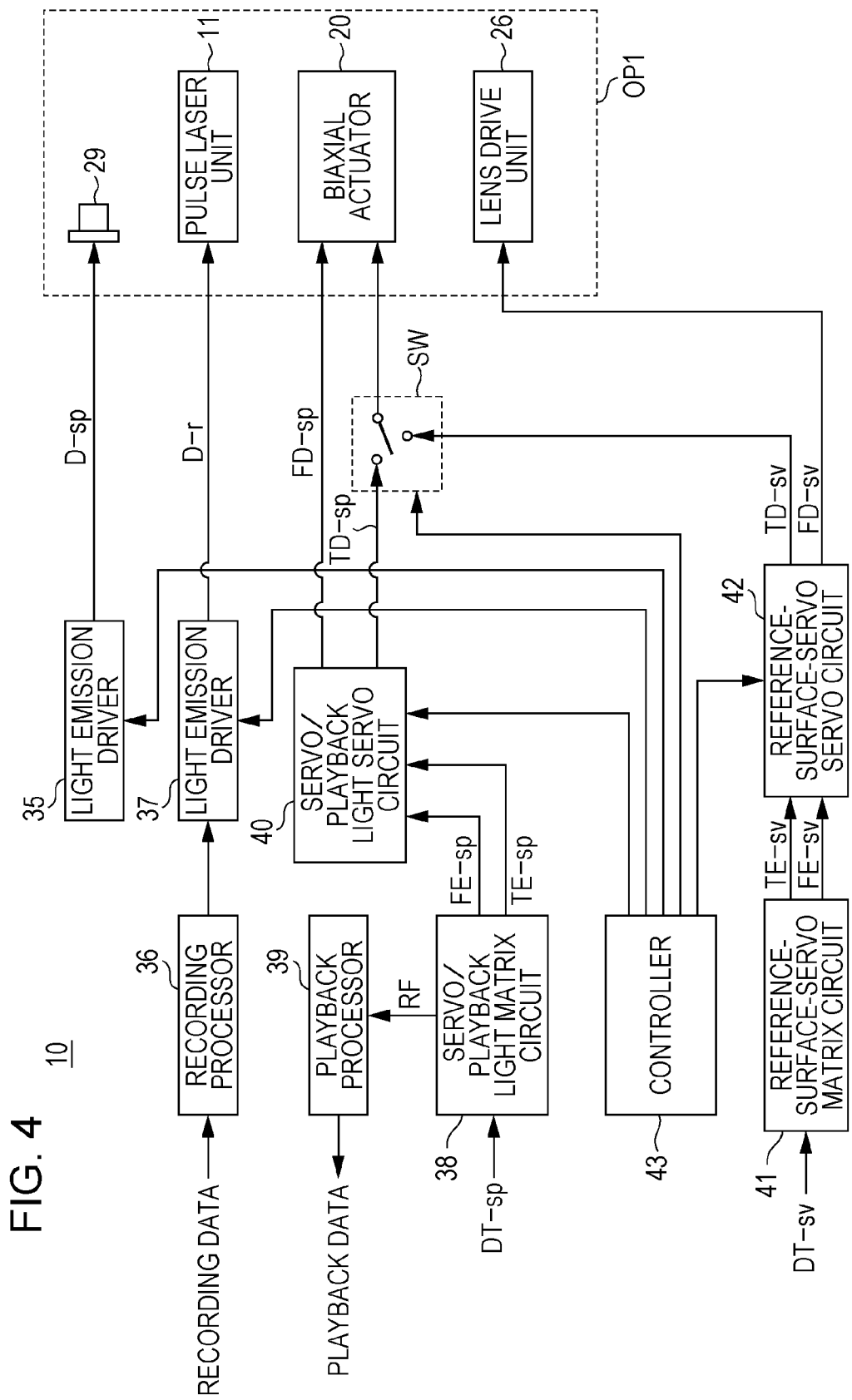
FIG. 4 illustrates an example of the internal configuration of the recording apparatus according to the first embodiment.

In the internal configuration of the optical pickup OP1 shown in FIG. 4, among the elements shown in FIG. 3, only the pulse laser unit 11, the biaxial actuator 20, the lens driving unit 26, and the servo/playback light laser device 29 are shown.

In FIG. 4, the recording apparatus 10 includes a light emission driver 35, a recording processor 36, a light emission driver 37, a servo/playback light matrix circuit 38, a playback processor 39, and a servo/playback light servo circuit 40. By the use of those element, a recording/playback operation is performed on a multilayered recording region (multilayer body formed by alternately stacking the intermediate layers 3 and the recording layers 4), and focusing/tracking control for the objective lens 19 is performed on the basis of reflected light from the interfaces L (and recording marks) formed in the recording region.

In response to an instruction from a controller 43, the light emission driver 35 drives the servo/playback light laser device 29 to emit light by using a laser drive signal D-sp.

The recording processor 36 generates recording modulation codes corresponding to input recording data. More specifically, the recording processor 36 adds error correcting codes to input recording data and performs predetermined modulation coding processing, thereby generating a recording modulation code string, e.g., a binary data string having "0"s and "1"s, which is to be recorded on the multilayered optical recording medium 1.

The recording processor 36 supplies a recording signal based on the recording modulation code string generated as described above to the light emission driver 37.

The light emission driver 37 generates a laser drive signal D-r on the basis of the recording signal input from the recording processor 36, and drives the pulse laser unit 11 to emit light on the basis of the laser drive signal D-r.

The servo/playback light matrix circuit 38 includes a current-voltage conversion circuit, a matrix operation/amplification circuit, etc., which are provided to receive and process light reception signals DT-sp (output currents) output from a plurality of light-receiving elements forming the servo/playback light receiver 34 shown in FIG. 3. The servo/playback light matrix circuit 38 generates certain signals by performing matrix operation processing.

More specifically, the servo/playback light matrix circuit 38 generates a radio signal (hereinafter referred to as a "playback signal RF") corresponding to a playback signal (readout signal) for the above-described recording modulation code string.

Additionally, as a signal for performing tracking servo control, the servo/playback light matrix circuit 38 generates a tracking error signal TE-sp indicating an amount of positional displacement (tracking errors) in the radial direction of an irradiation spot of servo/playback laser light from a recording mark string (track). As a signal for performing focus servo control, the servo/playback light matrix circuit 38 generates a focus error signal FE-sp indicating focus errors of servo/playback laser light applied to the interface L on which recording or playback is performed.

As is understood from the fact that the cylindrical lens 33 is disposed prior to the servo/playback light receiver 34, the focus error signal FE-sp is generated by using an astigmatic method. The same applies to a focus error signal FE-sv (see cylindrical lens 27 in FIG. 3), which will be discussed later.

The playback signal RF generated in the servo/playback light matrix circuit 38 is supplied to the playback processor 39.

The focus error signal FE-sp and the tracking error signal TE-sp are supplied to the servo/playback light servo circuit 40.

The playback processor 39 performs playback processing for reproducing the above-described recording data, such as binary processing for the playback signal RF and decoding/error-correcting processing for recording modulation codes, thereby obtaining playback data.

The servo/playback light servo circuit 40 generates a focus servo signal FS-sp and a tracking servo signal TS-sp on the basis of the focus error signal FE-sp and the tracking error signal TE-sp, respectively, supplied from the servo/playback light matrix circuit 38.

Then, the servo/playback light servo circuit 40 generates a focus drive signal FD-sp and a tracking drive signal TD-sp for driving the focus coil and the tracking coil, respectively, of the biaxial actuator 20, on the basis of the focus servo signal FS-sp and the tracking servo signal TS-sp, respectively.

The focus drive signal FD-sp is supplied to the biaxial actuator 20 (focus coil), as shown in FIG. 4.

In contrast, the tracking drive signal TD-sp is supplied to a switch SW. As will be discussed later, in this embodiment, a signal used for tracking servo control for the objective lens 19 is switched in accordance with the type of operation, i.e., recording (and seeking) or playback.

In response to an instruction from the controller 43, the servo/playback light servo circuit 40 turns OFF a tracking servo loop and supplies a jump pulse to the tracking coil of the biaxial actuator 20 via the switch SW, thereby performing a track jump operation for servo/playback laser light.

In response to an instruction from the controller 43, the servo/playback light servo circuit 40 also performs focus servo control for servo/playback laser light on a predetermined interface L, and performs a focus jump operation for servo/playback laser light.

As a signal processing system for reflected light returned from the reference surface Ref irradiated with reference-surface-servo laser light, the recording apparatus 10 includes a reference-surface-servo matrix circuit 41 and a reference-surface-servo servo circuit 42.

The reference-surface-servo matrix circuit 41 includes a current-voltage conversion circuit, a matrix operation/amplification circuit, etc., which are provided to receive and process light reception signals DT-sv (output currents) output from a plurality of light-receiving elements forming the reference-surface-servo light receiver 28 shown in FIG. 3. The reference-surface-servo matrix circuit 41 generates certain signals by performing matrix operation processing.

More specifically, as a signal for performing tracking servo control, the reference-surface-servo matrix circuit 41 generates a tracking error signal TE-sv indicating an amount of positional displacement (tracking errors) in the radial direction of an irradiation spot of reference-surface-servo laser light from the position guiding element (track) formed on the reference surface Ref As a signal for performing focus servo control, the reference-surface-servo matrix circuit 41 generates a focus error signal FE-sv indicating focus errors of reference-surface-servo laser light applied to the reference surface Ref (reflection film 5).

The focus error signal FE-sv and the tracking error signal TE-sv are supplied to the reference-surface-servo servo circuit 42.

The reference-surface-servo servo circuit 42 generates a focus servo signal FS-sv and a tracking servo signal TS-sv, respectively, from the focus error signal FE-sv and the tracking error signal TE-sv, respectively.

Then, the reference-surface-servo servo circuit 42 generates a focus drive signal FD-sv and a tracking drive signal TD-sv for driving the focus coil and the tracking coil, respectively, of the biaxial actuator 20, on the basis of the focus servo signal FS-sv and the tracking servo signal TS-sv, respectively.

The focus drive signal FD-sv is supplied to the lens driving unit 26 in the reference-surface-servo light focusing mechanism.

In contrast, the tracking drive signal TD-sv is supplied to the switch SW.

In response to an instruction from the controller 43, the reference-surface-servo servo circuit 42 turns OFF a tracking servo loop and supplies a jump pulse to the tracking coil of the biaxial actuator 20 via the switch SW, thereby performing a track jump operation for servo/playback laser light. In response to an instruction from the controller 43, the reference-surface-servo servo circuit 42 also performs focus servo control for reference-surface-servo laser light on the reference surface Ref.

In response to an instruction from the controller 43, the switch SW selects one of the tracking drive signal TD-sp and the tracking drive signal TD-sv and outputs the selected signal to the biaxial actuator 20 (tracking coil). This makes it possible to switch between tracking servo control performed based on reflected light returned from the interface L irradiated with servo/playback laser light and tracking servo control performed based on reflected light returned from the reference surface Ref irradiated with reference-surface-servo laser light.

The controller 43 is formed of, for example, a microcomputer including a central processing unit (CPU) and memory devices (storage devices), such as a read only memory (ROM) and a random access memory (RAM). The controller 43 executes control and processing, for example, in accordance with a program stored in the ROM, thereby performing the entire control of the recording apparatus 10.

For example, the controller 43 supplies instructions to the servo/playback light servo circuit 40, the reference-surface-servo servo circuit 42, and the switch SW, thereby implementing the switching of servo control in accordance with the type of operation, i.e., recording, playback, and seeking.

A specific mode of the switching among recording servo control, playback servo control, and seeking servo control in this embodiment will be discussed later.

The controller 43 specifies, for the servo/playback light servo circuit 40, the interface L on which recording or playback is performed, and causes the servo/playback light servo circuit 40 to perform focus servo control for servo/playback light laser light on the target interface L. That is, the controller 43 controls the selection of the interface L on which recording/playback is performed.

Although it is not shown, in the recording apparatus 10, the entirety of the optical pickup OP1 is slidable in the tracking direction by a slide mechanism (not shown). The servo/playback light servo circuit 40 or the reference-surface-servo servo circuit 42 performs control of the slide mechanism (e.g., slide servo control). As will be discussed later, in a recording or seeking operation, the reference-surface-servo servo circuit 42 performs tracking servo control for the objective lens 19, and thus, the reference-surface-servo servo circuit 42 performs control of the slide mechanism in a recording or seeking operation. In a playback operation, the servo/playback light servo circuit 40 performs tracking servo control for the objective lens 19, and thus, the servo/playback light servo circuit 40 performs control of the slide mechanism in a playback operation.

1-4. Servo Control Method of First Embodiment

A servo control method of the first embodiment will be described below with reference to FIGS. 5A through 6B.

Figure 5A:
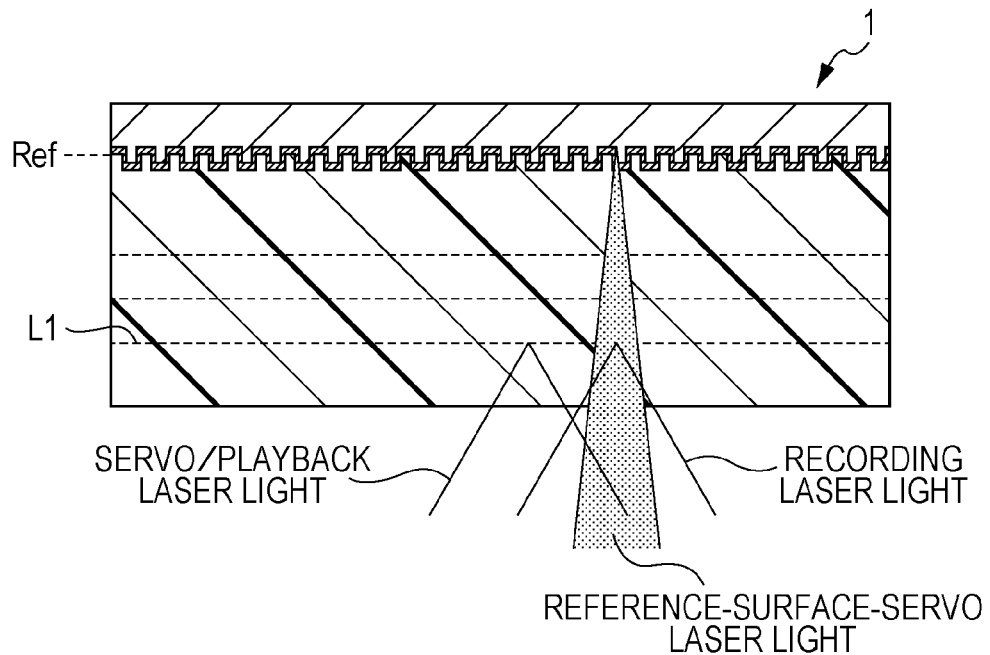
FIGS. 5A and 5B respectively illustrate laser light beams applied in a recording operation and a positional relationship among irradiation spots of the laser light beams according to the first embodiment.
Figure 5B:
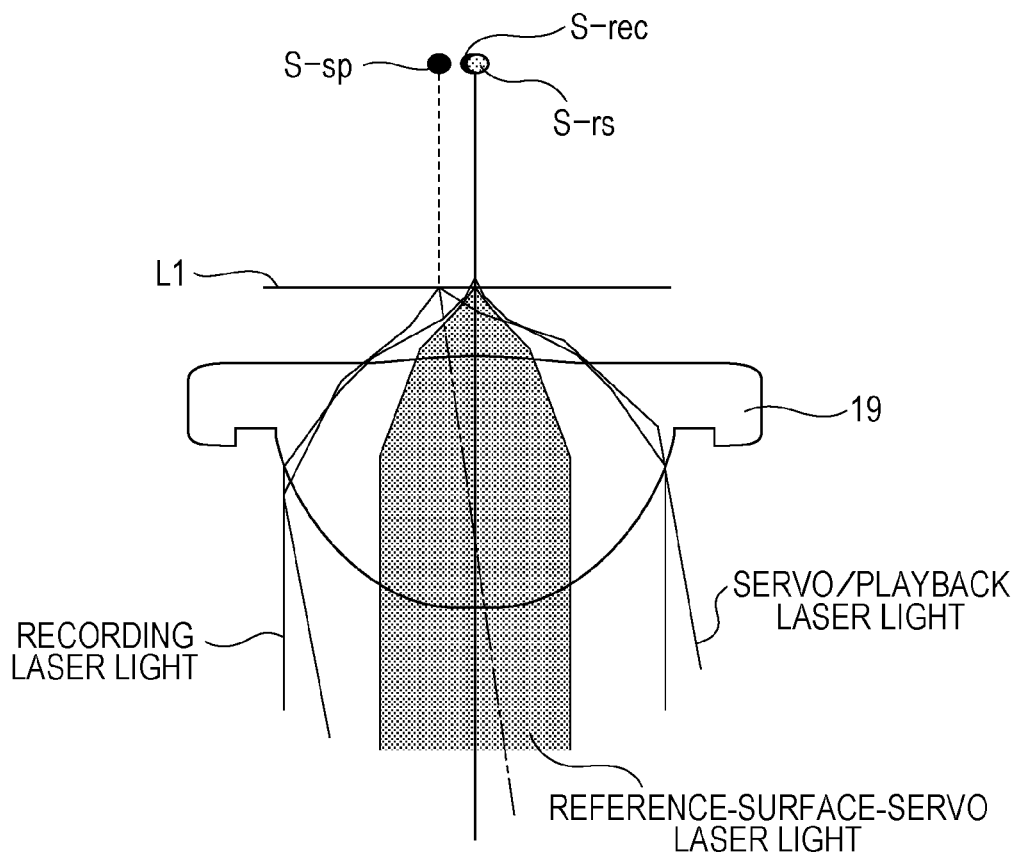

FIGS. 5A and 5B illustrate a servo control method when a recording operation is performed. More specifically, FIG. 5A illustrates individual laser light beams applied to the multilayered optical recording medium 1 in a recording operation, and FIG. 5B illustrates a positional relationship among irradiation spots of the laser light beams.

In FIGS. 5A through 6B, the topmost interface L1 is selected as an interface on which recording (playback) is performed.

FIGS. 5A and 5B show that, in the first embodiment, in a recording operation, servo/playback laser light, as well as recording laser light and reference-surface-servo laser light, is applied.

FIG. 5B shows that the irradiation spot of recording laser light is designated by S-rec, the irradiation spot of reference-surface-servo laser light is designated by S-rs, and the irradiation spot of servo/playback laser light is designated by S-sp.

As stated above, a position guiding element, such as pits or grooves, is not formed on the interface L. Accordingly, it is difficult to perform tracking servo control on the basis of reflected light from the interface L on which marks have not yet been formed when recording is started.

From this point of view, in a recording operation, tracking servo control is performed by using reflected light returned from the reference surface Ref irradiated with reference-surface-servo laser light. That is, the tracking coil of the biaxial actuator 20 is driven on the basis of the tracking error signal TE-sv generated from reflected light returned from the reflection film 5 on which reference-surface-servo laser light is focused.

As stated above, recording laser light is applied to the multilayered optical recording medium 1 through the same objective lens 19 as that for reference-surface-servo laser light. It is thus possible to control a spot position of the recording laser light to a suitable position (position in the tracking direction), in cooperation with a spot position of the reference-surface-servo laser light.

In this case, in order to implement tracking servo control by using the reference surface Ref, it is necessary that the reference-surface-servo laser light be in focus on the reference surface Ref. Accordingly, in a recording operation, the lens drive unit 26 is driven on the basis of the focus error signal FE-sv (i.e., a focus error signal generated from reflected light returned from the reference surface Ref irradiated with reference-surface-servo laser light) shown in FIG. 4, thereby performing focus servo control for bringing the reference-surface-servo laser light into focus on the reference surface Ref.

In a recording operation, concerning focus servo control for recording laser light in a recording operation, servo/playback laser light, which is applied to the multilayered optical recording medium 1 in the state in which the optical axis is tilted by the wedge prism 31 shown in FIG. 3, is used.

Since the optical axis of the servo/playback laser light is tilted with respect to the optical axis of the recording laser light, the reflected light returned from the interface L irradiated with the servo/playback laser light can be received independently of the reflected light returned from the interface L irradiated with the recording laser light. Accordingly, the generation of the focus error signal FE-sp is performed without being influenced by the reflected light returned from the interface L irradiated with the recording laser light.

As a result, it is possible to stably perform focus servo control (including applying servo/playback light on a target interface L) in a recording operation by utilizing pulse laser light as recording laser light.

Figure 6A:
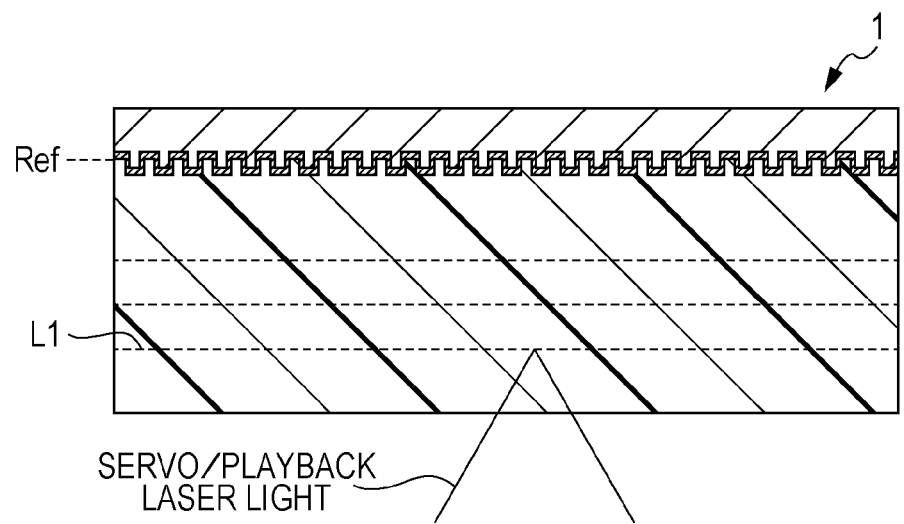
FIGS. 6A and 6B respectively illustrate laser light beams applied in a playback operation and a positional relationship among irradiation spots of the laser light beams according to the first embodiment.
Figure 6B:
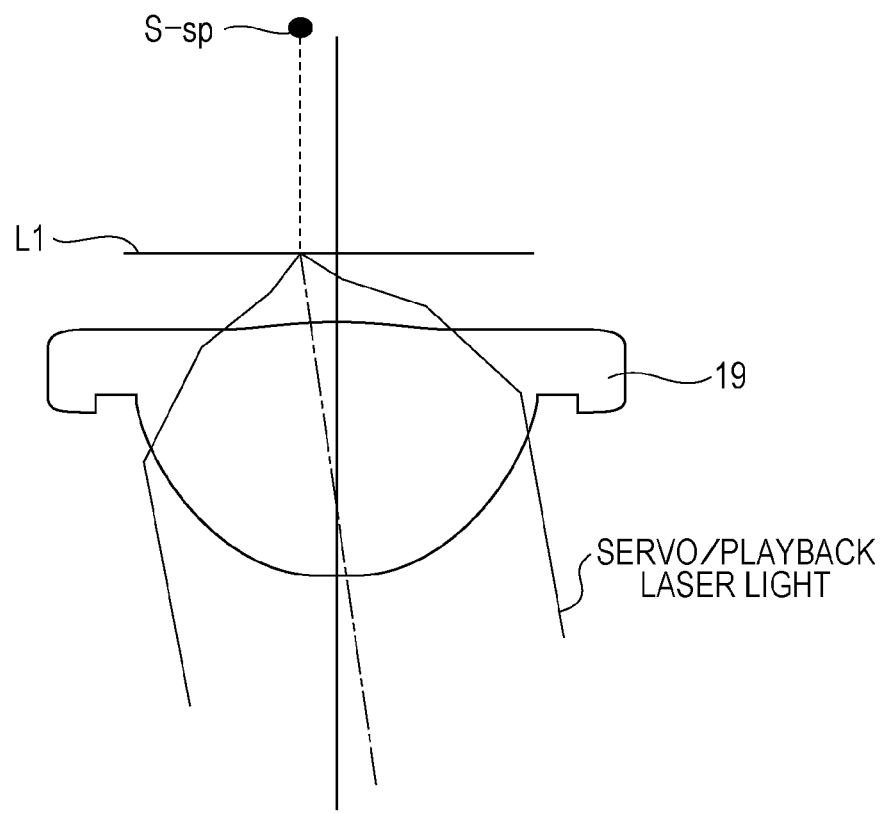

FIGS. 6A and 6B illustrate a servo control method when a playback operation is performed. More specifically, FIG. 6A illustrates laser light applied to the multilayered optical recording medium 1 in a playback operation, and FIG. 6B illustrates the position of an irradiation spot of the laser light.

FIGS. 6A and 6B show that, when playing back marks recorded on a certain interface L, servo/playback laser light is utilized.

More specifically, playback of marks, focus servo control, and tracking servo control are all performed on the basis of reflected light returned from the interface L irradiated with the servo/playback laser light.

In a playback operation, tracking servo control can be performed on a mark string (recording track) which has already been recorded on the interface L.

At the start of recording or playback on the multilayered optical recording medium 1, at least when recording is started on the interface L on which marks have not yet been recorded, a seeking operation is performed for seeking a predetermined recording position on the basis of address information recorded on the reference surface Ref.

When seeking a recording start position, tracking servo control for the objective lens 19 is performed on the basis of reflected light returned from the reference surface Ref irradiated with reference-surface-servo laser light. At the same time, focus servo control for the lens driving unit 26 on the basis of the focus error signal FE-sv is also performed.

In summary, servo control of the first embodiment is performed as follows.
—In Recording—

Concerning recording laser light, focus servo control is performed by driving the biaxial actuator 20 (focus coil) on the basis of the focus error signal FE-sp generated from reflected light returned from the interface L irradiated with servo/playback laser light. Tracking servo control is automatically performed by the driving of the biaxial actuator 20 on the basis of reflected light returned from the reference surface Ref irradiated with the following reference-surface-servo laser light.

Concerning reference-surface-servo laser light, focus servo control is performed by driving the lens driving unit 26 (reference-surface-servo light focusing mechanism) on the basis of the focus error signal FE-sv generated from reflected light returned from the reference surface Ref irradiated with reference-surface-servo laser light. Tracking servo control is performed by driving the biaxial actuator 20 (tracking coil) on the basis of the tracking error signal TE-sv generated from reflected light returned from the reference surface Ref irradiated with the reference-surface-servo laser light.
—In playback—

Concerning playback of marks, both of focus servo control and tracking servo control are performed by driving the biaxial actuator 20 on the basis of reflected light returned from the interface L irradiated with servo/playback laser light. Playback of marks themselves is also performed by utilizing reflected light returned from the interface L irradiated with the servo/playback laser light.

Concerning the reference surface, when playing back marks, servo control based on the reference-surface-servo laser light is not necessary.
—In seeking—

In order to read address information recorded on the reference surface Ref, the lens driving unit 26 and the biaxial actuator 20 (tracking coil) are respectively driven on the basis of the focus error signal FE-sv and the tracking error signal TE-sv generated from reflected light returned from the reference surface Ref irradiated with reference-surface-servo laser light.

A description will now be given of specific processing performed by the controller 43 in order to implement the switching of servo control in accordance with the type of operation, i.e., recording, playback, or seeking, in the first embodiment.

In a recording operation, the controller 43 first causes the reference-surface-servo servo circuit 42 to generate the tracking drive signal TD-sv and then causes the switch SW to select the tracking drive signal TD-sv. In a recording operation, the controller 43 also causes the reference-surface-servo servo circuit 42 to generate the focus drive signal FD-sv and then causes the lens drive unit 26 to perform driving on the basis of the focus drive signal FD-sv. With this control, the above-described recording servo control concerning reference-surface-servo laser light can be implemented.

Along with this control, in a recording operation, the controller 43 causes the servo/playback light servo circuit 40 to drive the biaxial actuator 20 (focus coil) on the basis of the focus drive signal FD-sp so that focus servo control for recording laser light (focus servo control on the interface L on which recording is performed) can be performed.

In a playback operation, the controller 43 causes the servo/playback light servo circuit 40 to generate the tracking drive signal TD-sp and also causes the switch SW to select the tracking drive signal TD-sp, thereby implementing tracking servo control for the objective lens 19 (i.e., tracking servo control for a recorded mark string) based on reflected light returned from the interface L irradiated with servo/playback laser light. In a playback operation, the controller 43 also causes the servo/playback light servo circuit 40 to drive the biaxial actuator 20 (focus coil) on the basis of the focus drive signal FD-sp so as to bring servo/playback laser light into focus on the interface L to be played back.

In a seeking operation, the controller 43 performs control for the reference-surface-servo servo circuit 42 and the switch SW similar to that performed in a recording operation. That is, the controller 43 causes the reference-surface-servo servo circuit 42 to generate the tracking drive signal TD-sv and then causes the switch SW to select the tracking drive signal TD-sv, and also causes the reference-surface-servo servo circuit 42 to drive the lens driving unit 26 on the basis of the focus drive signal FD-sv. With this control, it is possible to read address information from the reference surface Ref by using the reference-surface-servo laser light.

1-5 Summary

As described above, in this embodiment, when pulse laser light is utilized as recording laser light, focus servo control for the recording laser light is performed on the basis of reflected light returned from the interface L irradiated with servo/playback laser light (CW laser light) which is applied to the multilayered optical recording medium 1 after the optical axis of the CW laser light has been tilted.

The optical axis of the servo/playback laser light is tilted with respect to the optical axis of the recording laser light. Accordingly, when receiving the reflected light returned from the interface L irradiated with the servo/playback laser light, the influence of the reflected light returned from the interface L irradiated with the recording laser light can be reduced by an amount by which the optical axis of the servo/playback laser light is tilted. With this arrangement, the influence of pulse laser light when focus servo control is performed can be effectively reduced. As a result, it is possible to stably perform focus servo control when pulse laser light is utilized as recording laser light.

Additionally, in this embodiment, servo/playback laser light used for performing focus servo control in a recording operation is also utilized as laser light for playing back marks or for performing tracking servo control in a playback operation.

Accordingly, the configuration of the optical system is more simplified, compared with a case in which an extra light source is used for playing back marks or performing tracking servo control during a playback operation (in other words, a case in which CW laser light whose optical axis is tilted is used only for focus servo control). As a result, a reduction in the size and in the cost of the optical pickup OP1 due to a decreased number of components is implemented.

As the amount by which the optical axis of the servo/playback laser light is tilted increases, the influence of reflected light returned from the interface L irradiated with pulse laser light can be reduced more effectively. On the other hand, however, the generation of aberration (in particular, coma aberration) increases.

Accordingly, the amount by which the optical axis of servo/playback laser light is tilted may be set to an optimal value in consideration of a tradeoff between a decreased influence of reflected light returned from the interface L irradiated with pulse laser light and an increased amount of aberration, although it also depends on the aberration correction capability of the objective lens 19.

2. Second Embodiment

A second embodiment will be discussed below.

In the second embodiment, laser light for playing back marks and for performing focus/tracking servo control in a playback operation is separately applied to the multilayered optical recording medium 1. That is, by considering the influence of aberration which may be generated when CW laser light whose optical axis is tilted is used, another CW laser light is applied to and received from the multilayered optical recording medium 1 when marks are played back or servo control is performed in a playback operation.

Figure 7:
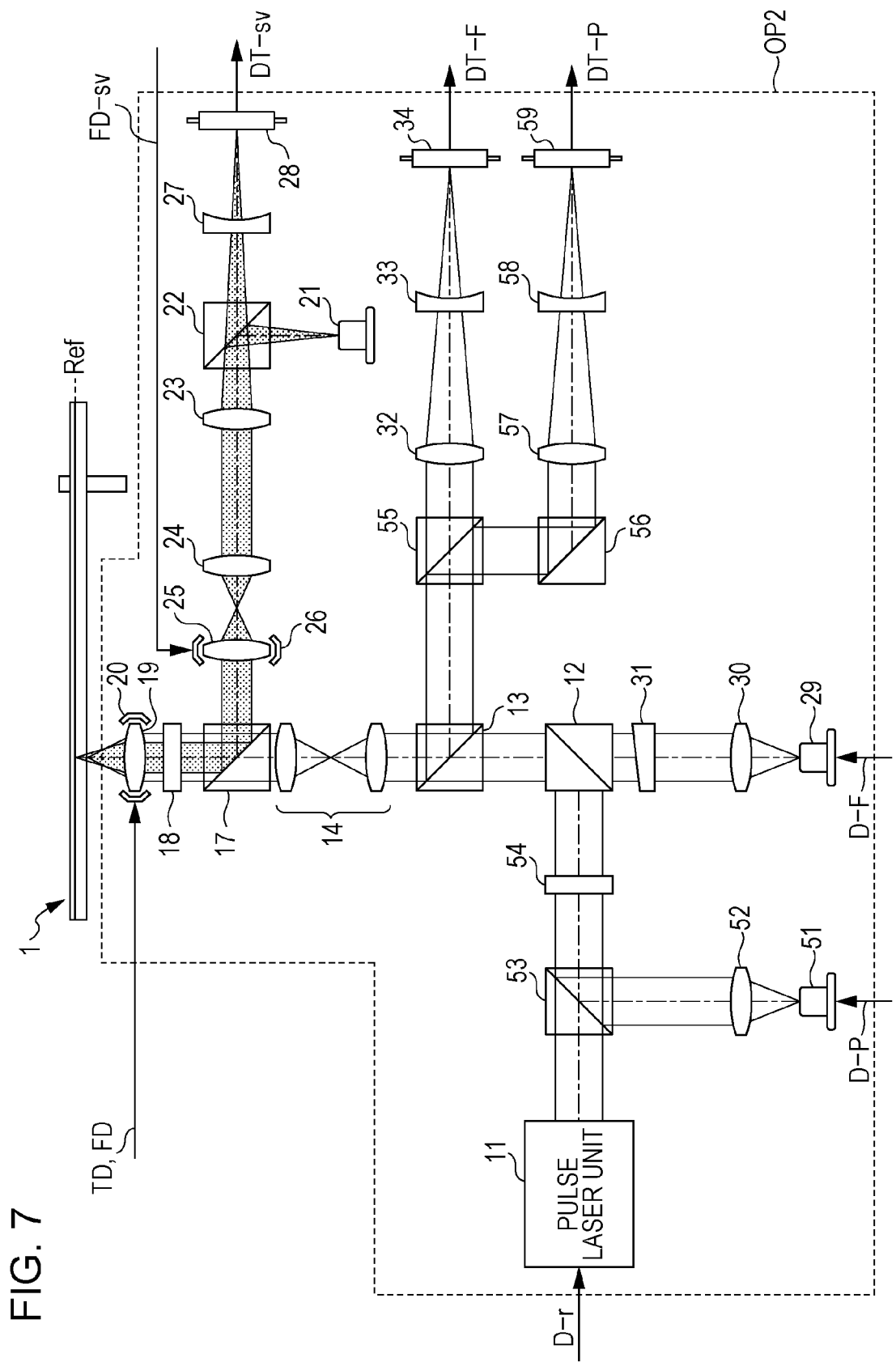
FIG. 7 illustrates an example of the configuration of an optical system included in a recording apparatus according to a second embodiment.

FIG. 7 illustrates an example of the configuration of an optical system included in a recording apparatus 50 according to the second embodiment. More specifically, FIG. 7 illustrates an example of the internal configuration of an optical pickup OP2 included in the recording apparatus 50.

Figure 8:
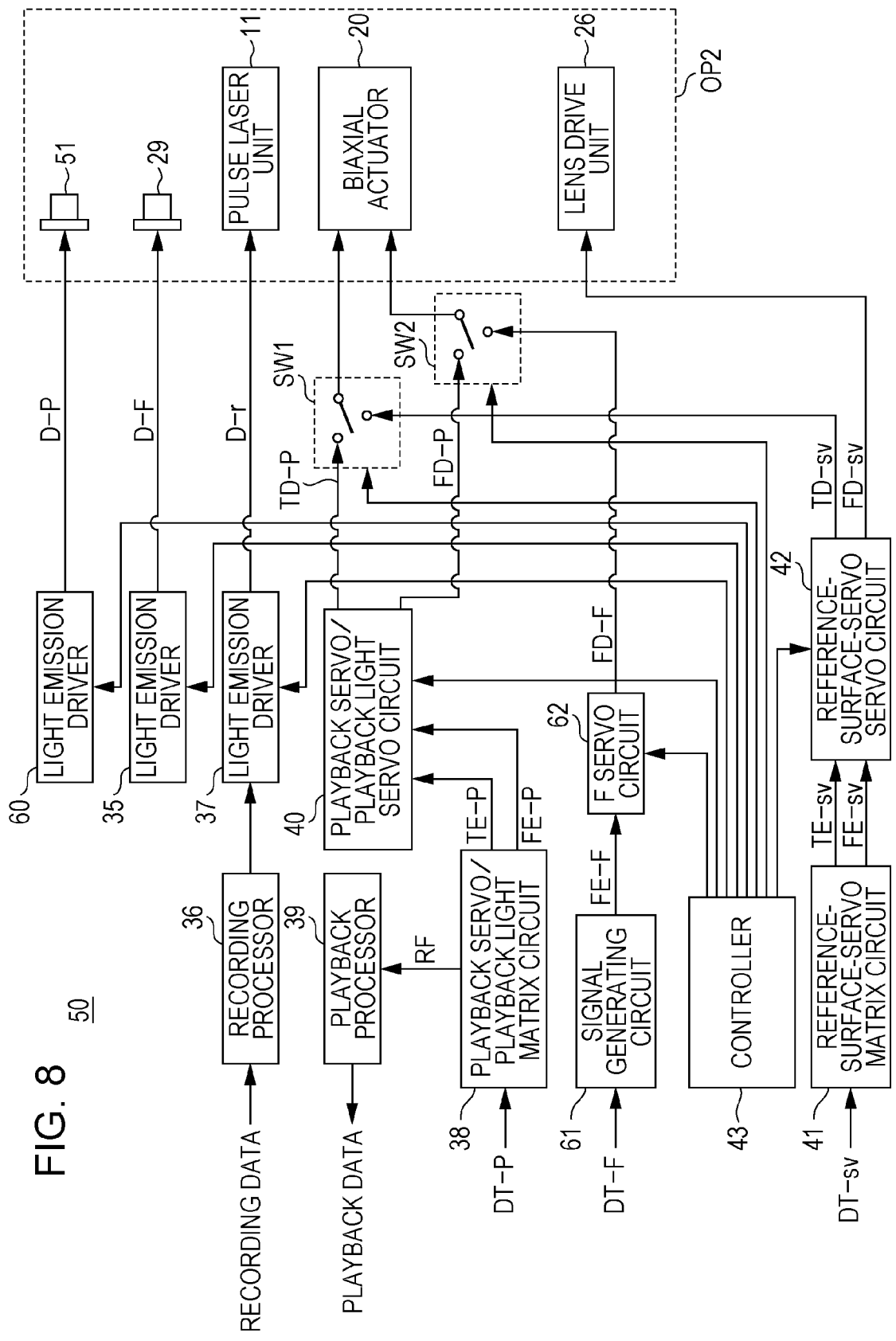
FIG. 8 illustrates an example of the internal configuration of the recording apparatus according to the second embodiment.

FIG. 8 illustrates an example of the entire internal configuration of the recording apparatus 50 of the second embodiment.

In the following description, elements similar to those described above will be designated by like reference numerals, and an explanation thereof will thus be omitted.

In FIG. 7, the optical pickup OP2 of the second embodiment includes, in addition to the elements of the optical pickup OP1 shown in FIG. 3, a playback servo/playback light laser device 51, a collimation lens 52, a polarization beam splitter 53, a half wavelength retardation plate 54, a beam splitter 55, a polarization beam splitter 56, a condensing lens 57, a cylindrical lens 58, and a playback servo/playback light receiver 59.

In the second embodiment, the laser light source used as the servo/playback light laser device 29 in the first embodiment is dedicated to the use of focus servo control for recording laser light.

Similarly, the light receiver used as the servo/playback light receiver 34 in the first embodiment is dedicated to the use of focus servo control for recording laser light.

From this point of view, in the second embodiment, the servo/playback light laser device 29 and the servo/playback light receiver 34 are indicated by the F servo light laser device 29 and the F servo light receiver 34, respectively. "F" is an abbreviation of focus.

Accordingly, in the second embodiment, a drive signal of the F servo light laser device 29 (supplied from the light emission driver 35 shown in FIG. 8) is designated by D-F, and a reception signal of the F servo light receiver 34 is designated by DT-F.

In FIG. 7, the playback servo/playback light laser device 51 emits CW laser light having a wavelength equivalent to that of the F servo light laser device 29. That is, the CW laser light has a wavelength (in this case, 405 nm) equivalent to that of pulse laser light.

The laser light emitted from the playback servo/playback light laser device 51 is referred to as "playback servo/playback laser light".

The playback servo/playback light laser device 51 is driven to emit light on the basis of a drive signal D-tp, which will be discussed later.

The playback servo/playback laser light emitted from the playback servo/playback light laser device 51 is collimated by the collimation lens 52 and is incident on the polarization beam splitter 53.

In this case, the polarization beam splitter 53 is configured to transmit P-polarized components and to reflect S-polarized components.

Accordingly, concerning the playback servo/playback laser light incident on the polarization beam splitter 53, the S-polarized components are reflected by the polarization beam splitter 53, and the optical axis of the S-polarized components is tilted so as to coincide with that of recording laser light emitted from the pulse laser unit 11, Recording laser light passing through the polarization beam splitter 53 in a recording operation and playback servo/playback laser light reflected by the polarization beam splitter 53 in a playback operation are partially reflected by the beam splitter 12 after passing through the half wavelength retardation plate 54, and are then output to the polarization beam splitter 13.

In this case, the polarization directions of the recording laser light and the playback servo/playback laser light are rotated by the half wavelength retardation plate 54. More specifically, the polarization directions of the recording laser light and the playback servo/playback laser light are rotated (they are rotated in directions from the P polarized light and the S polarized light, respectively, by a predetermined amount). Thus, the polarization beam splitter 13 transmits part of the recording laser light and the playback servo/playback laser light (P-polarized components).

After passing through the polarization beam splitter 13, the playback servo/playback laser light is applied to the multilayered optical recording medium 1 through the expander 14, the dichroic prism 17, the quarter wavelength retardation plate 18, and the objective lens 19 in this order.

The reflected light returned from the multilayered optical recording medium 1 irradiated with the playback servo/playback laser light is incident on the polarization beam splitter 13 through the objective lens 19, the quarter wavelength retardation plate 18, the dichroic prism 17, and the expander 14 in this order, and is reflected by the polarization beam splitter 13.

After being reflected by the polarization beam splitter 13, the reflected light returned from the multilayered optical recording medium 1 irradiated with the playback servo/playback laser light is partially reflected by the beam splitter 55 and is output to the polarization beam splitter 56.

The polarization beam splitter 56 is configured to transmit P-polarized components and to reflect S-polarized components. Accordingly, after being reflected by the beam splitter 55, the reflected light (S-polarized light) returned from the multilayered optical recording medium 1 irradiated with the playback servo/playback laser light is reflected by the polarization beam splitter 56.

Then, after being reflected by the polarization beam splitter 56, the reflected light returned from the multilayered optical recording medium 1 irradiated with the playback servo/playback laser light is converted into convergent light by the condensing lens 57, and is focused on the light receiving surface of the playback servo/playback light receiver 59 via the cylindrical lens 58.

A reception signal obtained as a result of receiving the reflected light returned from the multilayered optical recording medium 1 irradiated with the playback servo/playback laser light by the playback servo/playback light receiver 59 is designated by DT-P, as shown in FIG. 7.

As will be discussed later, in the second embodiment, during a recording operation, the playback servo/playback light laser device 51 is turned OFF, and the playback servo/playback light receiver 59 is not used. In contrast, during a playback operation, the F servo light laser device 29 is turned OFF, and the F servo light receiver 34 is not used.

Accordingly, during a recording operation, the F servo light receiver 34 can be avoided from receiving reflected light returned from the multilayered optical recording medium 1 irradiated with playback servo/playback laser light. Conversely, during a playback operation, the playback servo/playback light receiver 59 can be avoided from receiving reflected light returned from the multilayered optical recording medium 1 irradiated with F servo laser light. That is, the possibility of the occurrence of such crosstalk is low.

The optical system for F servo laser light is configured to support laser light whose optical axis is tilted at a predetermined angle. Thus, from this point of view, too, the possibility of the occurrence of the above-described crosstalk is low.

The entire internal configuration of the recording apparatus 50 will now be described below with reference to FIG. 8. In the internal configuration of the optical pickup OP2 shown in FIG. 8, among the elements shown in FIG. 7, only the pulse laser unit 11, the biaxial actuator 20, the lens driving unit 26, the F servo light laser device 29, and the playback servo/playback light laser device 51 are shown.

The difference between the recording apparatus 50 and the recording apparatus 10 shown in FIG. 4, except for the configuration of the optical pickup OP, in that a light emission driver 60, a signal generating circuit 61, an F servo circuit 62, and a switch SW2 are added to the recording apparatus 50.

In the second embodiment, the counterpart of the servo/playback light matrix circuit 38 of the first embodiment is indicated by the playback servo/playback light matrix circuit 38, as shown in FIG. 8, for its purpose of use, though the configuration thereof is similar to that of the servo/playback light matrix circuit 38.

Similarly, in the second embodiment, the counterpart of the servo/playback light servo circuit 40 of the first embodiment is indicated by the playback servo/playback light servo circuit 40, as shown in FIG. 8, for its purpose of use, though the configuration thereof is similar to that of the servo/playback light servo circuit 40.

The switch SW1 shown in FIG. 8 has a function similar to that of the switch SW of the first embodiment. However, it is designated by SW1 simply because a new switch SW2 is added.

In FIG. 8, in response to an instruction from the controller 43, the light emission controller 60 drives the playback servo/playback light laser device 51 within the optical pickup OP2 to emit light by using the drive signal D-P.

The playback servo/playback light matrix circuit 38 generates a playback signal RF, a tracking error signal TE, and a focus error signal FE on the basis of the reception signal DT-P obtained from the playback servo/playback light receiver 59 shown in FIG. 7.

The tracking error signal TE and the focus error signal FE generated by the playback servo/playback light matrix circuit 38 on the basis of the reception signal DT-P are indicated by the tracking error signal TE-P and the focus error signal FE-P, respectively.

The playback servo/playback light servo circuit 40 generates a tracking drive signal TD-P and a focus drive signal FD-P for performing tracking servo control and focus servo control, respectively, on the basis of the tracking error signal TE-P and the focus error signal FE-P, respectively.

The tracking drive signal TD-P is supplied to the switch SW1.

The focus drive signal FD-P is supplied to the switch SW2.

The signal generating circuit 61 generates a focus error signal FE on the basis of the reception signal DT-F obtained by the F servo light receiver 34. The focus error signal FE is indicated by the focus error signal FE-F.

The F servo circuit 62 generates a focus servo signal on the basis of the focus error signal FE-F, and generates a focus drive signal FD for driving the focus coil of the biaxial actuator 20 on the basis of the focus servo signal. The focus drive signal FD is indicated by the focus drive signal FD-F.

As shown in FIG. 8, the focus drive signal FD-F is supplied to the switch SW2.

In response to an instruction from the controller 43, the F servo circuit 62 performs focus servo control for F servo laser light on a predetermined interface L (i.e., focus servo control for recording laser light) and performs a focus jump operation for F servo laser light.

In response to an instruction from the controller 43, the switch SW1 selects one of the tracking drive signal TD-P from the playback servo/playback light servo circuit 40 and the tracking drive signal TD-sv from the reference-surface-servo light servo circuit 42, and outputs the selected tracking drive signal to the biaxial actuator 20 (tracking coil).

In response to an instruction from the controller 43, the switch SW2 selects one of the focus drive signal FD-P from the playback servo/playback light servo circuit 40 and the focus drive signal FD-F from the F servo circuit 62, and outputs the selected focus drive signal to the biaxial actuator 20 (focus coil).

In the above-configured recording apparatus 50, in a recording operation, as in the first embodiment, tracking servo control for recording laser light is performed by driving the biaxial actuator 20 on the basis of reflected light returned from the reference surface Ref irradiated with reference-surface-servo laser light. Focus servo control for recording laser light is performed by driving the biaxial actuator 20 on the basis of reflected light returned from the interface L irradiated with laser light (in this case, F servo laser light) whose optical axis is tilted.

As in the first embodiment, in a recording operation, in order to implement tracking servo control by using the reference surface Ref, focus servo control is performed for bringing the reference-surface-servo laser light into focus on the reference surface Ref by driving the lens drive unit 26 on the basis of reflected light returned from the reference surface Ref irradiated with reference-surface-servo laser light.

Figure 9A:
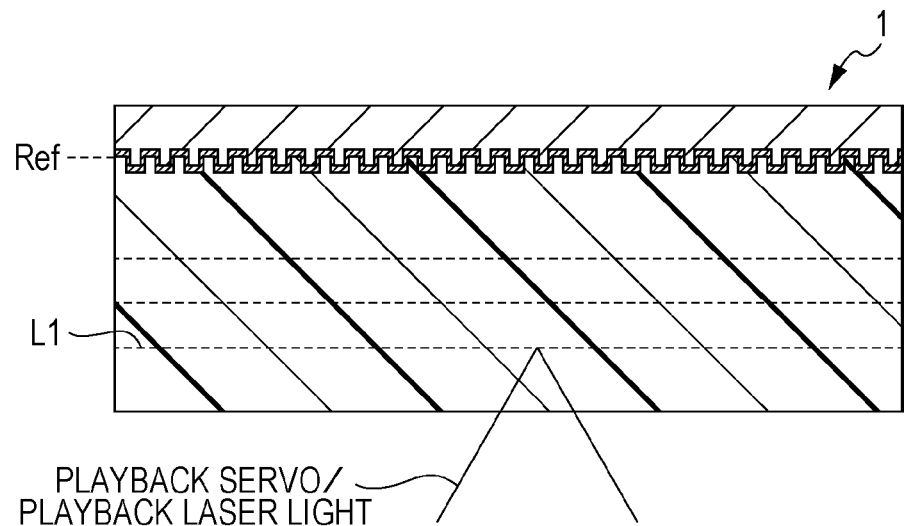
FIGS. 9A and 9B respectively illustrate laser light beams applied in a playback operation and a positional relationship among irradiation spots of the laser light beams according to the second embodiment.
Figure 9B:
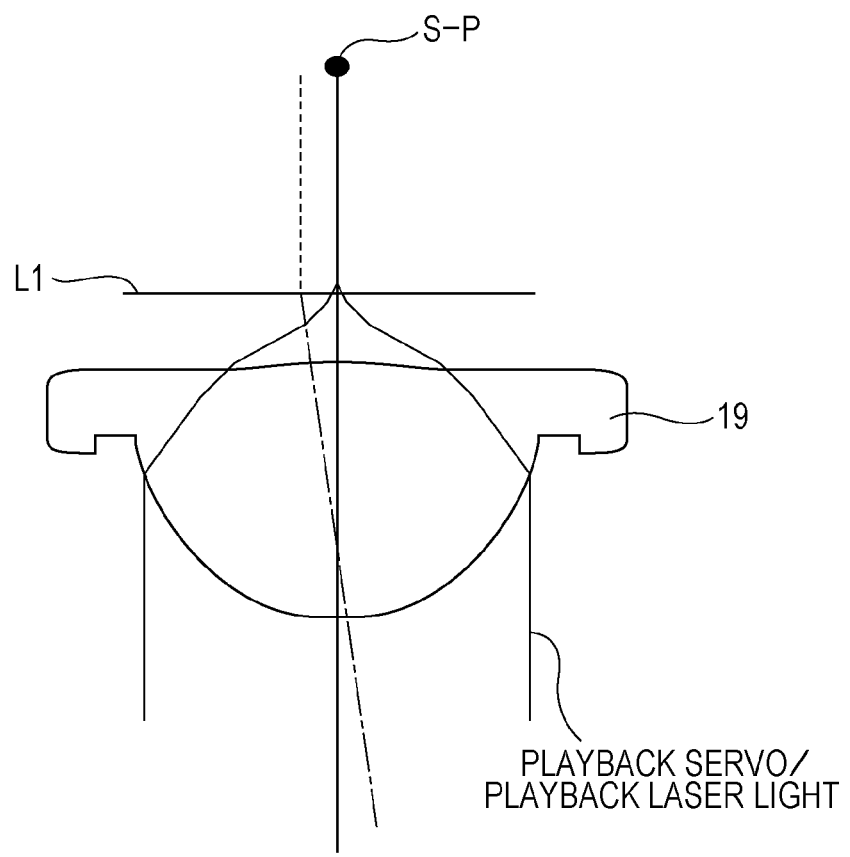

In the second embodiment, in a playback operation, only playback servo/playback laser light is applied, as shown in FIGS. 9A and 9B. That is, in this case, in a playback operation, playback of marks and tracking/focus servo control for the objective lens 19 are performed on the basis of reflected light returned from the interface L irradiated with playback servo/playback laser light.

In FIG. 9B, the irradiation spot of playback servo/playback laser light is indicated by spot S-P.

In summary, servo control of the second embodiment is performed as follows.

—In Recording—

Concerning recording laser light, focus servo control is performed by driving the biaxial actuator 20 (focus coil) on the basis of the focus error signal FE-F generated from reflected light returned from the interface L irradiated with F servo laser light. As in the first embodiment, tracking servo control is automatically performed by the driving of the biaxial actuator 20 on the basis of reflected light returned from the reference surface Ref irradiated with reference-surface-servo laser light.

Concerning reference-surface-servo laser light, focus servo control is performed by driving the lens driving unit 26 (reference-surface-servo light focusing mechanism) on the basis of the focus error signal FE-sv generated from reflected light returned from the reference surface Ref irradiated with reference-surface-servo laser light. Tracking servo control is performed by driving the biaxial actuator 20 (tracking coil) on the basis of the tracking error signal TE-sv generated from reflected light returned from the reference surface Ref irradiated with the reference-surface-servo laser light.

—In Playback—

Concerning playback of marks, both of focus servo control and tracking servo control are performed by driving the biaxial actuator 20 on the basis of reflected light returned from the interface L irradiated with playback servo/playback laser light. Playback of marks themselves is also performed by utilizing reflected light returned from the interface L irradiated with the playback servo/playback laser light.

Concerning the reference surface, when playing back marks, servo control based on the reference-surface-servo laser light is not necessary.

—In Seeking—

In order to read address information recorded on the reference surface Ref, the lens driving unit 26 and the biaxial actuator 20 (tracking coil) are respectively driven on the basis of the focus error signal FE-sv and the tracking error signal TE-sv generated from reflected light returned from the reference surface Ref irradiated with reference-surface-servo laser light.

As is seen from the above-described summary, in the second embodiment, the F servo laser light whose optical axis is tilted is applied only during a recording operation. Accordingly, in a playback operation, the F servo light laser device 29 is turned OFF.

The playback servo/playback laser light is applied only during a playback operation. Accordingly, in a recording operation, the playback servo/playback light laser device 51 is turned OFF.

In order to implement the above-described servo control method in a recording operation, a playback operation, and a seeking operation, the controller 43 performs the following processing.

In a recording operation, in order to implement reference-surface-servo control by using the reference surface Ref, the controller 43 causes the reference-surface-servo servo circuit 42 to generate the tracking drive signal TD-sv and then causes the switch SW1 to select the tracking drive signal TD-sv. The controller 43 also causes the reference-surface-servo servo circuit 42 to drive the lens drive unit 26 on the basis of the focus drive signal FD-sv.

Along with this control, in a recording operation, the controller 43 causes the F servo circuit 62 to generate the focus drive signal FD-F and also causes the switch SW2 to select the focus drive signal FD-F, thereby implementing focus servo control for the objective lens 19 on the basis of reflected light returned from the interface L irradiated with F servo laser light applied to the multilayered optical recording medium 1 in the state in which the optical axis is tilted.

In contrast, in a playback operation, the controller 43 causes the playback servo/playback light servo circuit 40 to generate the tracking drive signal TD-P and also causes the switch SW1 to select the tracking drive signal TD-P, thereby implementing tracking servo control for the objective lens 19 (i.e., tracking servo control for a recorded mark string) based on reflected light returned from the interface L irradiated with playback servo/playback laser light. In a playback operation, the controller 43 also causes the playback servo/playback light servo circuit 40 to generate the focus drive signal FD-P and also causes the switch SW2 to select the focus drive signal FD-P, thereby implementing focus servo control for the objective lens 19 on the basis of reflected light returned from the interface L irradiated with playback servo/playback laser light.

In a seeking operation, the controller 43 performs control for the reference-surface-servo servo circuit 42 and the switch SW1 similar to that performed in a recording operation. That is, the controller 43 causes the reference-surface-servo servo circuit 42 to generate the tracking drive signal TD-sv and then causes the switch SW1 to select the tracking drive signal TD-sv. The controller 43 also causes the reference-surface-servo servo circuit 42 to drive the lens driving unit 26 on the basis of the focus drive signal FD-sv. With this control, it is possible to read address information from the reference surface Ref by using the reference-surface-servo laser light.

3. Third Embodiment

In a third embodiment, tracking servo control for recording laser light is implemented by performing adjacent track servo (ATS) control by utilizing servo/playback laser light in the first embodiment as ATS light.

The configuration of a recording apparatus of the third embodiment is similar to that of the first embodiment, and thus, it is not shown.

The ATS control will be discussed below with reference to FIG. 10.

Figure 10:
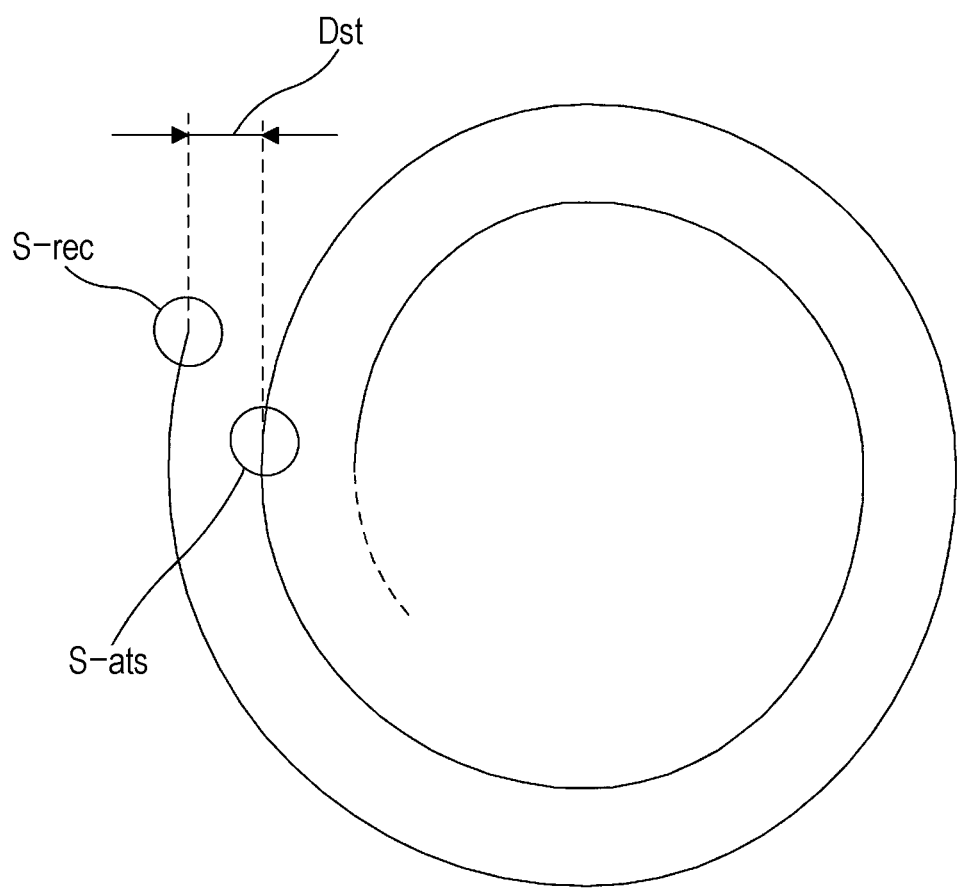
FIG. 10 illustrates adjacent track servo (ATS) control.

As shown in FIG. 10, along with an irradiation spot of recording laser light (referred to as "recording spot S-rec"), a spot for the ATS control (referred to as "ATS spot S-ats") is formed. The recording spot S-rec and the ATS spot S-ats are formed by applying associated light beams via the same objective lens. In this case, the interval Dst in the tracking direction between the recording spot S-rec and the ATS spot S-ats corresponds to one track.

In the ATS control, the recording spot S-rec is used as a preceding spot, while the ATS spot S-ats is used as a following spot. Then, on a mark string formed by the recording spot S-rec, tracking servo control is performed by using the ATS spot S-ats. That is, tracking servo control for the objective lens 19 is performed such that the ATS spot S-ats follows a recording track which was previously formed by the recording spot S-rec.

In such ATS control, the track pitch can be kept constant as the interval Dst between the spots S.

Assume that, as in the first embodiment, tracking servo control for the objective lens 19 in a recording operation is performed on the basis of reflected light returned from the reference surface Ref irradiated with reference-surface-servo laser light. In this case, due to the influence of shift or tilt of the objective lens 19 accompanied by the eccentricity of a disc, it is difficult to accurately adjust the spot position (in the tracking direction) of recording laser light to the tracking position of the reference surface Ref. That is, because of shift or tilt of the objective lens 19, a positional displacement in the tracking direction between a spot position of reference-surface-servo laser light and that of recording laser light occurs. The reason for this is as follows. The reference-surface-servo laser light and the recording laser light are incident on the objective lens 19 with different collimation states (degrees of convergence, parallelization, and divergence) so that the reference-surface-servo laser light is brought in focus on the reference surface Re, while the recording laser light is brought in focus at a depth different from the reference surface Ref.

Such a displacement in the spot position may lead to the following problem. If, for example, discs are changed and the type of eccentricity of a new disc is different from a disc that has been used, overlapping or intersecting of tracks may occur between a previously recorded portion and a recorded portion after the discs are changed, which may cause discontinuation of playback.

If any measures against the occurrence of a displacement in the spot position are taken, such as setting the track pitch on the reference surface Ref to be relatively wide, or suitably correcting for tilt, it is not necessary to consider the occurrence of overlapping or intersecting of tracks. However, if, for example, the track pitch is decreased in order to improve the recording density, a displacement in the spot position may cause the above-described problem.

In the above-described ATS control, the track pitch of tracks recorded with recording laser light can be kept constant as the interval Dst between the spots S. That is, even if the track pitch is decreased, the problem of overlapping or intersecting of tracks due to the eccentricity of a disc, for example, can be avoided.

Figure 11:
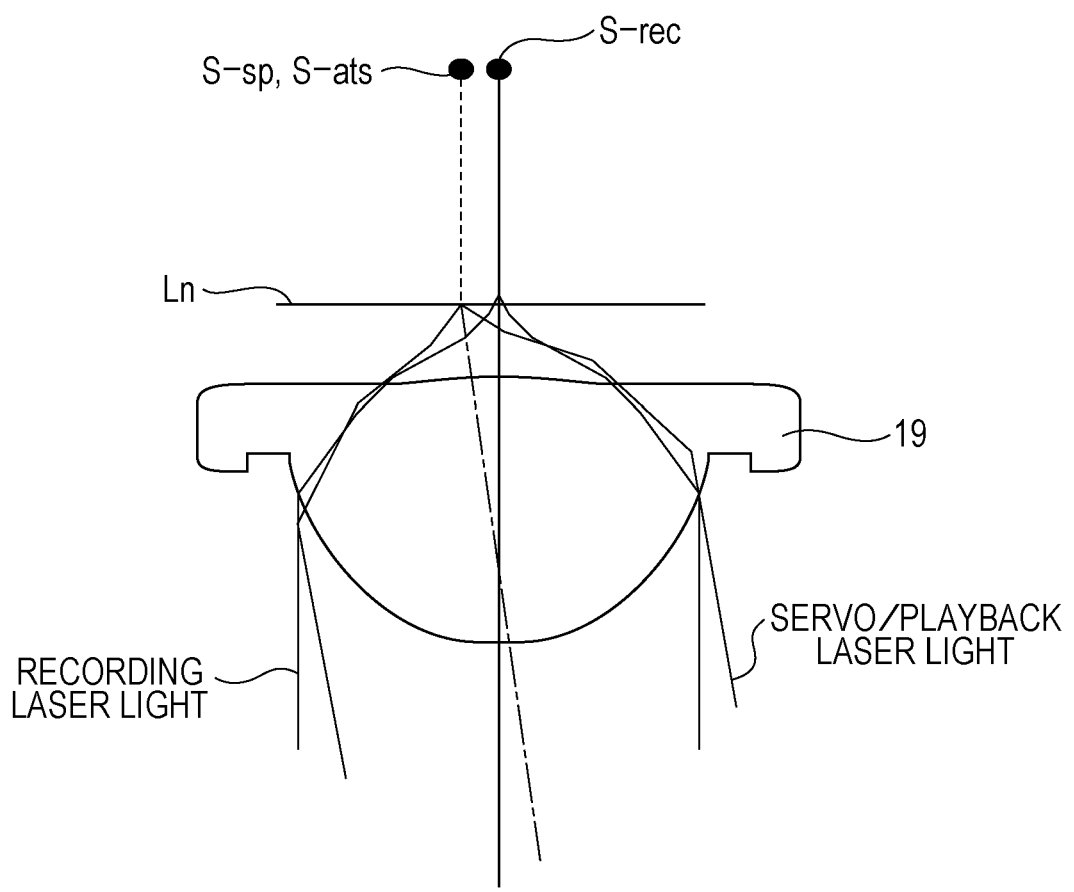
FIG. 11 illustrates laser light beams applied when ATS control is performed in a third embodiment.

FIG. 11 illustrates laser light beams applied to a recording medium when recording is performed in accordance with the ATS control in the third embodiment. In FIG. 11, "Ln" indicates an interface L on which recording is performed.

In the third embodiment, as shown in FIG. 11, when recording is performed, recording laser light and servo/playback laser light are applied. As stated above, the servo/playback laser light is applied as ATS light. The ATS light is applied so that the interval from the irradiation spot S-sp (i.e., S-ats) in the tracking direction and the irradiation spot of recording laser light is the above-described interval Dst. That is, the optical axis of the servo/playback laser light is tilted by the wedge prism 31 so that the interval between the spot S-rec and the spot S-sp in the tracking direction corresponds to one track.

In this case, the direction in which the optical axis of the servo/playback laser light is tilted by the wedge prism 31 is set so that the spot S-sp serves as a following spot that follows the spot S-rec.

In the third embodiment, tracking servo control for the objective lens 19 during a recording operation is performed on the basis of reflected light returned from the interface L irradiated with servo/playback laser light in which tilting of the optical axis is adjusted. That is, in the first embodiment, reflected light returned from the reference surface Ref irradiated with reference-surface-servo laser light is utilized for performing tracking servo control for the objective lens 19 during a recording operation. In the third embodiment, however, reflected light returned from the interface L irradiated with servo/playback laser light is utilized.

In summary, servo control operations in recording, playback, and seeking of the third embodiment are performed as follows.

—In Recording—

Concerning recording laser light, both of focus servo control and tracking servo control are performed by driving the biaxial actuator 20 on the basis of reflected light returned from the interface L irradiated with servo/playback laser light. That is, tracking servo control is performed under the ATS control.

Concerning reference-surface-servo laser light, since the ATS control is performed, tracking servo control based on reflected light returned from the reference surface Ref irradiated with reference-surface-servo laser light is not necessary. Accordingly, focus servo control (control for the lens drive unit 26) based on reflected light returned from the reference surface Ref irradiated with reference-surface-servo laser light is not necessary.

—In Playback—

Concerning playback of marks, both of focus servo control and tracking servo control are performed by driving the biaxial actuator 20 on the basis of reflected light returned from the interface L irradiated with servo/playback laser light. Playback of marks themselves is also performed by utilizing reflected light returned from the interface L irradiated with the servo/playback laser light.

Concerning the reference surface, when playing back marks, servo control based on the reference-surface-servo laser light is not necessary.

—In Seeking—

In order to read address information recorded on the reference surface Ref, the lens driving unit 26 and the biaxial actuator 20 (tracking coil) are respectively driven on the basis of the focus error signal FE-sv and the tracking error signal TE-sv generated from reflected light returned from the reference surface Ref irradiated with reference-surface-servo laser light.

In order to implement the above-described servo control method in a recording operation, a playback operation, and a seeking operation, in the third embodiment, the controller 43 performs the following processing.

In a recording operation, the controller 43 causes the servo/playback light servo circuit 40 to generate the focus drive signal FD-sp and to drive the biaxial actuator 20 (focus coil) on the basis of the focus drive signal FD-sp, thereby implementing focus servo control for recording laser light on the basis of reflected light returned from the interface L irradiated with servo/playback laser light.

In a recording operation, the controller 43 also causes the servo/playback light servo circuit 40 to generate the tracking drive signal TD-sp and also causes the switch SW to select the tracking drive signal TD-sp, thereby implementing tracking servo control for recording laser light on the basis of reflected light returned from the interface L irradiated with servo/playback laser light (ATS control).

In the third embodiment, processing performed by the controller 43 for switching among servo operations in accordance with the type of operation, i.e., a playback operation or a seeking operation, is similar to that of the first embodiment, and an explanation thereof will thus be omitted.

4. Modified Examples

Embodiments of the present application have been described by way of example. However, the present application is not restricted to the above-described embodiments. Modified examples will be discussed below.

Although no reference has been made above, it is more difficult for the pulse laser unit 11 used as the recording laser light source to manage wavelength variations than for the servo/playback light laser device 29 (playback servo/playback light laser device 51) used as the CW laser light source.

If wavelength variations are generated between the recording laser light and the CW laser light, which is used for focus servo control for the recording laser light, the focus position of the recording laser light is displaced from that of the CW laser light, which may fail to accurately bring the recording laser light into focus on the target interface L.

In order to solve this problem, a focus bias corresponding to wavelength variations between servo/playback laser light (playback servo/playback laser light) and recording laser light is applied to a servo loop of recording focus servo control performed on the basis of reflected light returned from the interface L irradiated with the servo/playback laser light (playback servo/playback laser light).

Figure 12:
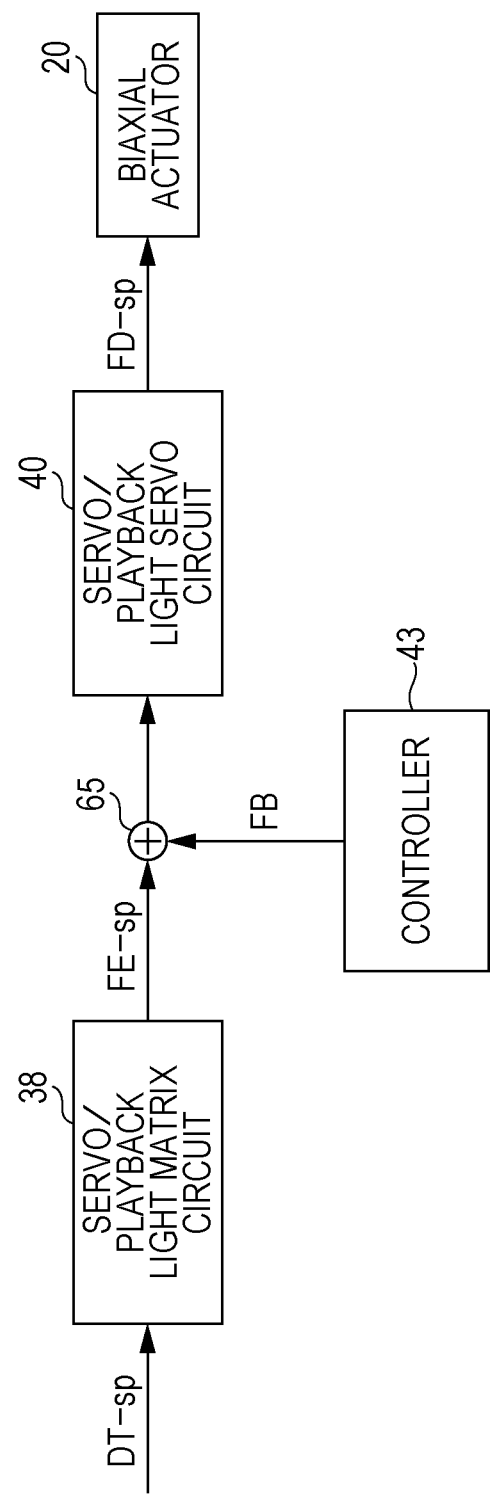
FIG. 12 illustrates an example of the configuration of a recording apparatus as a modified example.

FIG. 12 illustrates an example of the configuration of a recording apparatus, which serves as a modified example, for applying such a focus bias.

In the configuration of the recording apparatus shown in FIG. 12, only a portion related to the application of a focus bias is shown, and other portions are omitted. The configuration shown in FIG. 12 is a configuration of the recording apparatus when a focus bias is applied to the recording apparatus of the first or third embodiment. It is, however, possible to apply a focus bias to the recording apparatus of the second embodiment.

As shown in FIG. 12, in the recording apparatus of this modified example, an adder 65 is inserted between the servo/playback light matrix circuit 38 and the servo/playback light servo circuit 40. In other words, the focus error signal FE-sp is supplied from the servo/playback light matrix circuit 38 to the servo/playback light servo circuit 40 through the adder 65. Then, a focus bias (designated by FB in FIG. 12) corresponding to a wavelength variation between the recording laser light and the servo/playback laser light is applied to the adder 65 under the control of the controller 43. This focus bias functions to eliminate differences between the focus position of the recording laser light and that of the servo/playback laser light.

As for the focus bias FB, a plurality of focus bias values may be set, and as a result of applying the focus bias values on a trial basis, the value of a focus bias that can minimize the difference between the focus position of the recording laser light and that of the servo/playback laser light may be determined, and then, such a focus bias may be applied.

Although in the foregoing embodiments the wedge prism 31 is provided as a measure for tilting the optical axis, another measure may be taken, for example, a liquid crystal element may be used or the angle at which a CW laser device is installed may be tilted.

If a liquid crystal element is used, it is driven so that an optical path length difference is provided to transmitted light in a plane orthogonal to the optical axis, thereby tilting the optical axis.

Although in the foregoing embodiments the reference surface Ref is disposed on the bottom side of the multilayered optical recording region, it may be disposed on the top side of the optical recording region.

If the reference surface Ref is disposed on the top side of the optical recording region, a reflection film forming the reference surface Ref which is configured to reflect light having the same wavelength band as that of reference-surface-servo laser light and to transmit light (recording laser light, servo/playback laser light, etc.) having a wavelength band other than that of the reference-surface-servo laser light is provided.

Even if the reference surface Ref is provided on the bottom side of the multilayered recording region, as in the foregoing embodiments, it is desirable that a reflection film exhibiting the above-described wavelength selectivity be provided as the reflection film 5. More specifically, if such a reflection film is provided, servo/playback laser light (F servo laser light and playback servo/playback laser light) passes through the reflection film 5 after coming into focus on the target interface L, thereby suppressing a decrease in the playback performance due to, for example, stray light.

In the above-described embodiments, as the position guiding element formed on the reference surface Ref, a guide groove section, such as a group of grooves or pits, is formed. However, as the position guiding element, marks recorded on a phase change film may be used.

In the above-described embodiments, the present application is applied to recording performed on a multilayered optical recording medium. However, the present application may suitably be utilized for recording performed on a single-layer optical recording medium. That is, the present application may find wide application in recording performed on optical recording media by utilizing pulse laser light as recording laser light.

In the foregoing description, the optical recording medium used in the present application is a disc-like recording medium. However, the optical recording medium may be formed in another shape, for example, in a rectangle.

The present application may be implemented by the following configurations (1) through (7).

(1) A recording apparatus comprising:
- a recording light source configured to emit pulse laser light for recording;
- a first light source configured to emit first continuous wave laser light;
- an irradiation optical system configured to irradiate an optical recording medium with the pulse laser light and the first continuous wave laser light via an objective lens in the state in which an optical axis of the first continuous wave laser light is tilted with respect to an optical axis of the pulse laser light;
- a reception optical system configured to output, to a first light receiver, a returned light portion of the first continuous wave laser light which has been reflected by a reflection surface formed on the optical recording medium and which has been input through the objective lens; and
- a focus servo controller configured to perform focus servo control for the objective lens on the basis of a first reception signal obtained by the first light receiver.

(2) The recording apparatus according to (1), further comprising:
- a focus bias applying unit configured to apply a focus bias which corresponds to a wavelength difference between the pulse laser light and the first continuous wave laser light to a focus servo loop formed by the focus servo controller.

(3) The recording apparatus according to (1) or (2), wherein the optical recording medium is a multilayered optical recording medium including a reference surface, which serves as a reflection surface on which a position guiding element is formed, and a plurality of reflection surfaces formed at positions having depths different from the reference surface, marks being recorded in the vicinities of the reflection surfaces other than the reference surface, the recording apparatus further comprising:
- a reference-surface-servo light source configured to emit reference-surface-servo laser light having a wavelength different from a wavelength of the pulse laser light or the first continuous wave laser light;
- a reference-surface-servo optical system configured to output the reference-surface-servo laser light to the objective lens and to output, to a reference-surface-servo light receiver, a returned light portion of the reference-surface-servo laser light which has been reflected by the reference surface and which has been input into the objective lens; and
- a reference-surface tracking servo controller configured to perform tracking servo control for the objective lens when recording is performed, on the basis of a reception signal obtained by the reference-surface-servo light receiver.

(4) The recording apparatus according to (1), (2), or (3), further comprising:
- a first playback unit configured to play back a signal recorded on the optical recording medium on the basis of the first reception signal; and
- a first tracking servo controller configured to perform tracking servo control for the objective lens on the basis of the first reception signal when playback is performed by the first playback unit.

(5) The recording apparatus according to (1), (2), or (3), further comprising:
- a second light source configured to emit second continuous wave laser light;
- a second continuous wave laser optical system configured to output the second continuous wave laser light to the objective lens in the state in which an optical axis of the second continuous wave laser light coincides with the optical axis of the pulse laser light, and to output, to a second light receiver, a returned light portion of the second continuous wave laser light which has been reflected by the reflection surface and which has been input via the objective lens;
- a second playback unit configured to play back a signal recorded on the optical recording medium on the basis of a second reception signal obtained by the second light receiver; and
- a second tracking servo controller configured to perform tracking servo control for the objective lens on the basis of the second reception signal when playback is performed by the second playback unit.

(6) The recording apparatus according to (1) or (2), wherein an amount by which the optical axis of the first continuous wave laser light is tilted with respect to the optical axis of the pulse laser light is set so that an interval in the tracking direction between an irradiation spot of the pulse laser light and an irradiation spot of the first continuous wave laser light corresponds to one track, the recording apparatus further comprising:
- an adjacent track servo controller configured to perform tracking servo control for the objective lens on the basis of the first reception signal so that the irradiation spot of the first continuous wave laser light follows a mark string which has already been recorded by the pulse laser light.

(7) The recording apparatus according to one of (1) to (6), wherein the optical axis of the first continuous wave laser light is tilted by the use of a wedge prism or a liquid crystal element or by an adjustment of an angle at which the first light source is installed.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A recording apparatus comprising:
- a recording light source configured to emit pulse laser light for recording;
- a first light source configured to emit first continuous wave laser light;
- an irradiation optical system configured to irradiate an optical recording medium with the pulse laser light and the first continuous wave laser light via an objective lens in the state in which an optical axis of the first continuous wave laser light is tilted with respect to an optical axis of the pulse laser light;
- a reception optical system configured to output, to a first light receiver, a returned light portion of the first continuous wave laser light which has been reflected by a reflection surface formed on the optical recording medium and which has been input through the objective lens;

a focus servo controller configured to perform focus servo control for the objective lens on the basis of a first reception signal obtained by the first light receiver;

a reference-surface-servo light source configured to emit reference-surface-servo laser light having a wavelength different from a wavelength of the pulse laser light or the first continuous wave laser light; and a reference-surface-servo optical system configured to output the reference-surface-servo laser light to the objective lens and to output, to a reference-surface-servo light receiver, a returned light portion of the reference-surface-servo laser light which has been reflected by a reference surface and which has been input into the objective lens, the reference surface being different than one or more reflection surfaces that are recording surfaces of the optical recording medium.

2. The recording apparatus according to claim 1, further comprising:

a focus bias applying unit configured to apply a focus bias which corresponds to a wavelength difference between the pulse laser light and the first continuous wave laser light to a focus servo loop formed by the focus servo controller.

3. The recording apparatus according to claim 1, wherein the optical recording medium is a multilayered optical recording medium including the reference surface, which serves as the reflection surface on which a position guiding element is formed, and a plurality of reflection surfaces formed at positions having depths different from the reference surface, marks being recorded in the vicinities of the reflection surfaces other than the reference surface, the recording apparatus further comprising:

a reference-surface tracking servo controller configured to perform tracking servo control for the objective lens when recording is performed, on the basis of a reception signal obtained by the reference-surface-servo light receiver.

4. The recording apparatus according to claim 1, further comprising:

a first playback unit configured to play back a signal recorded on the optical recording medium on the basis of the first reception signal; and a first tracking servo controller configured to perform tracking servo control for the objective lens on the basis of the first reception signal when playback is performed by the first playback unit.

5. The recording apparatus according to claim 1, further comprising:

a second light source configured to emit second continuous wave laser light;

a second continuous wave laser optical system configured to output the second continuous wave laser light to the objective lens in the state in which an optical axis of the second continuous wave laser light coincides with the optical axis of the pulse laser light, and to output, to a second light receiver, a returned light portion of the second continuous wave laser light which has been reflected by the reflection surface and which has been input via the objective lens;

a second playback unit configured to play back a signal recorded on the optical recording medium on the basis of a second reception signal obtained by the second light receiver; and a second tracking servo controller configured to perform tracking servo control for the objective lens on the basis of the second reception signal when playback is performed by the second playback unit.

6. The recording apparatus according to claim 1, wherein an amount by which the optical axis of the first continuous wave laser light is tilted with respect to the optical axis of the pulse laser light is set so that an interval in the tracking direction between an irradiation spot of the pulse laser light and an irradiation spot of the first continuous wave laser light corresponds to one track, the recording apparatus further comprising:

an adjacent track servo controller configured to perform tracking servo control for the objective lens on the basis of the first reception signal so that the irradiation spot of the first continuous wave laser light follows a mark string which has already been recorded by the pulse laser light.

7. The recording apparatus according to claim 1, wherein the optical axis of the first continuous wave laser light is tilted by the use of a wedge prism or a liquid crystal element or by an adjustment of an angle at which the first light source is installed.

8. A servo control method for a recording apparatus that performs recording on an optical recording medium by utilizing pulse laser light, the servo control method comprising:

irradiating the optical recording medium with the pulse laser light and first continuous wave laser light via an objective lens, an optical axis of the first continuous wave laser light being tilted with respect to an optical axis of the pulse laser light; and performing focus servo control for the objective lens on the basis of a first reception signal obtained by receiving a returned light portion of the first continuous wave laser light which has been reflected by a reflection surface formed on the optical recording medium and which has been input via the objective lens;

emitting reference-surface-servo laser light having a wavelength different from a wavelength of the pulse laser light or the first continuous wave laser light; and outputting the reference-surface-servo laser light to the objective lens and outputting, to a reference-surface-servo light receiver, a returned light portion of the reference-surface-servo laser light which has been reflected by a reference surface and which has been input into the objective lens, the reference surface being different than one or more reflection surfaces that are recording surfaces of the optical recording medium.

* * * * *